US005933526A

United States Patent [19]
Sklarew

[11] Patent Number: 5,933,526
[45] Date of Patent: Aug. 3, 1999

[54] HANDWRITTEN KEYBOARDLESS ENTRY COMPUTER SYSTEM

[75] Inventor: Ralph Sklarew, Reston, Va.

[73] Assignee: AST Research, Inc., Irvine, Calif.

[21] Appl. No.: 08/480,441

[22] Filed: Jun. 7, 1995

Related U.S. Application Data

[63] Continuation of application No. 08/377,298, Jan. 23, 1995, which is a continuation of application No. 08/190,745, Jan. 31, 1994, abandoned, which is a continuation of application No. 07/775,167, Oct. 11, 1991, Pat. No. 5,297,216, which is a division of application No. 07/523,447, May 14, 1990, Pat. No. 5,157,737, which is a continuation of application No. 07/029,772, Mar. 24, 1987, Pat. No. 4,972,496, which is a continuation-in-part of application No. 06/889,513, Jul. 25, 1986, abandoned.

[51] Int. Cl.[6] ...................................................... G06K 9/00
[52] U.S. Cl. ............................................ 382/189; 382/309
[58] Field of Search .................................... 382/186, 187, 382/189, 309; 348/161

[56] References Cited

U.S. PATENT DOCUMENTS

| | | | |
|---|---|---|---|
| 3,248,705 | 4/1966 | Dammann et al. | 340/172.5 |
| 3,308,253 | 3/1967 | Krakinowski | 200/46 |
| 3,487,371 | 12/1969 | Frank | 382/13 |
| 3,530,437 | 9/1970 | Booker, Jr. et al. | 340/172.5 |
| 3,699,439 | 10/1972 | Turner | 324/71 |
| 3,760,373 | 9/1973 | Bartz | 340/172.5 |
| 3,761,877 | 9/1973 | Fernald | 340/146.3 |
| 3,832,693 | 8/1974 | Ishizaki et al. | 340/172.5 |
| 3,868,636 | 2/1975 | Schlang | 340/146.35 |
| 3,872,462 | 3/1975 | Lemelson | 340/324 |
| 3,903,517 | 9/1975 | Hafner | 340/324 |

(List continued on next page.)

FOREIGN PATENT DOCUMENTS

| | | |
|---|---|---|
| 1108764 | 5/1978 | Canada . |
| 0156394 | 10/1985 | European Pat. Off. . |
| 0157354 | 10/1985 | European Pat. Off. . |
| 0232905 | 8/1987 | European Pat. Off. . |
| 3511353 | 10/1986 | Germany . |
| 53-7131 | 1/1978 | Japan . |
| 55-135973 | 10/1980 | Japan . |
| 55-143681 | 11/1980 | Japan . |

(List continued on next page.)

OTHER PUBLICATIONS

S. Kasanuki et al., "Sophisticated Man–Machine Systems (2)," 30th Conference of the Data Processing Society of Japan (1985), pp. 1831–1832, 1985.

Kuzunki, S., et al. "Handwritten Characters and Graphics Recognition Technology for Workstation", *Hitachi Hyoron*, vol. 67, No. 3, pp. 243–246, (1985).

Driscoll, R.J., et al. "Real–Time Reading of Handwritten Symbols and Applications", Proceedings of the Conference on Digital Processing of Signals in Communications, Sep. 9, 1977, Institute of Electronic and Radio Engineers, pp. 293–302.

(List continued on next page.)

*Primary Examiner*—Christopher S. Kelley
*Attorney, Agent, or Firm*—Knobbe, Martens Olson & Bear, LLP

[57] ABSTRACT

A keyboardless entry computer system includes a transparent input screen that generates positional information when contacted by a stylus, and a display screen mounted physically below the input screen such that a character that is displayed can be seen below the input screen. The system includes a computer that has been programmed to compile the positional information into Strokes, to calculate Stroke characteristics, and then compare the Stroke characteristics with those stored in a database in order to recognize the symbol drawn by the stylus. Key features of the system are: (1) transparent position sensing subsystem; (2) underlying display on which to mimic drawing of sensed positions and to show characters or symbols; (3) means to convert sensed positions first into plotted Points and then into recognized characters or symbols; and (4) means to "learn" to associate sensed input positions with a character or symbol.

5 Claims, 16 Drawing Sheets

U.S. PATENT DOCUMENTS

| | | | |
|---|---|---|---|
| 3,916,099 | 10/1975 | Hlady | 178/18 |
| 3,932,859 | 1/1976 | Kyriakides et al. | 340/324 |
| 4,016,542 | 4/1977 | Azure | 340/172.5 |
| 4,055,726 | 10/1977 | Turner et al. | 178/19 |
| 4,071,691 | 1/1978 | Pepper, Jr. | 178/19 |
| 4,112,415 | 9/1978 | Hilbrink | 340/146.35 |
| 4,129,747 | 12/1978 | Pepper, Jr. | 178/19 |
| 4,159,417 | 6/1979 | Rubincam | 235/375 |
| 4,177,354 | 12/1979 | Mathews | 178/18 |
| 4,177,448 | 12/1979 | Brayton | 340/146.3 |
| 4,187,147 | 2/1980 | Seelbach | 340/146.6 |
| 4,195,353 | 3/1980 | Abe et al. | 364/900 |
| 4,198,539 | 4/1980 | Pepper, Jr. | 178/18 |
| 4,218,760 | 8/1980 | Levy | 364/900 |
| 4,262,281 | 4/1981 | Buckle et al. | 340/146.3 |
| 4,293,734 | 10/1981 | Pepper, Jr. | 178/18 |
| 4,302,011 | 11/1981 | Pepper, Jr. | 273/85 |
| 4,318,096 | 3/1982 | Thornburg et al. | 340/706 |
| 4,353,552 | 10/1982 | Pepper, Jr. | 273/85 |
| 4,365,235 | 12/1982 | Greanias et al. | 340/146.3 |
| 4,371,746 | 2/1983 | Pepper, Jr. | 178/18 |
| 4,386,232 | 5/1983 | Slater | 178/18 |
| 4,419,661 | 12/1983 | Hetsugi | 340/707 |
| 4,430,917 | 2/1984 | Pepper, Jr. | 84/1.01 |
| 4,456,787 | 6/1984 | Schlosser et al. | 178/19 |
| 4,475,239 | 10/1984 | van Raamsdonk | 382/57 |
| 4,491,960 | 1/1985 | Brown | 382/26 |
| 4,495,644 | 1/1985 | Parks et al. | 382/3 |
| 4,520,357 | 5/1985 | Castleberry et al. | 340/783 |
| 4,521,909 | 6/1985 | Wang | 382/38 |
| 4,542,526 | 9/1985 | Satoh et al. | 382/13 |
| 4,545,023 | 10/1985 | Mizzi | 364/709 |
| 4,553,258 | 11/1985 | Chainer et al. | 382/3 |
| 4,559,598 | 12/1985 | Goldwasser et al. | 364/419 |
| 4,578,811 | 3/1986 | Inagaki | 382/11 |
| 4,586,035 | 4/1986 | Baker et al. | 340/712 |
| 4,587,630 | 5/1986 | Straton et al. | 364/900 |
| 4,607,386 | 8/1986 | Morita et al. | 382/13 |
| 4,641,354 | 2/1987 | Fukunga et al. | 382/13 |
| 4,653,107 | 3/1987 | Shojima et al. | 382/13 |
| 4,672,677 | 6/1987 | Yamakawa | 382/13 |
| 4,679,241 | 7/1987 | Lukis | 382/13 |
| 4,680,430 | 7/1987 | Yoshikawa et al. | 178/19 |
| 4,680,803 | 7/1987 | Dilella | 382/9 |
| 4,680,804 | 7/1987 | Kuzunuki et al. | 382/13 |
| 4,703,316 | 10/1987 | Sherbeck | 340/706 |
| 4,718,102 | 1/1988 | Crane et al. | 382/13 |
| 4,718,103 | 1/1988 | Shojima et al. | 382/13 |
| 4,727,588 | 2/1988 | Fox et al. | 382/13 |
| 4,730,186 | 3/1988 | Koga et al. | 340/708 |
| 4,739,314 | 4/1988 | McCaskill et al. | 340/709 |
| 4,752,965 | 6/1988 | Dunkley et al. | 382/3 |
| 4,755,634 | 7/1988 | Pepper, Jr. | 178/18 |
| 4,763,356 | 8/1988 | Day, Jr. et al. | 379/368 |
| 4,766,425 | 8/1988 | Tallman et al. | 340/712 |
| 4,775,811 | 10/1988 | Okano | 307/514 |
| 4,778,951 | 10/1988 | Pepper, Jr. et al. | 178/18 |
| 4,786,896 | 11/1988 | Harte | 340/712 |
| 4,792,859 | 12/1988 | Wicker et al. | 358/294 |
| 4,793,810 | 12/1988 | Beasley, Jr. | 434/165 |
| 4,821,029 | 4/1989 | Logan et al. | 340/712 |
| 4,821,030 | 4/1989 | Batson et al. | 340/712 |
| 4,827,410 | 5/1989 | Corren | 364/200 |
| 4,827,530 | 5/1989 | Yamaguchi et al. | 382/13 |
| 4,833,625 | 5/1989 | Fisher et al. | 364/518 |
| 4,846,694 | 7/1989 | Erhardt | 434/365 |
| 4,847,696 | 7/1989 | Matsumoto et al. | 358/335 |
| 4,847,775 | 7/1989 | Roch et al. | 364/469 |
| 4,860,372 | 8/1989 | Kuzunuki et al. | 382/13 |
| 4,873,623 | 10/1989 | Lane et al. | 364/188 |
| 4,972,496 | 11/1990 | Sklarew | 382/187 |
| 5,157,737 | 10/1992 | Sklarew | 382/315 |
| 5,297,216 | 3/1994 | Sklarew | 382/314 |

FOREIGN PATENT DOCUMENTS

| | | | |
|---|---|---|---|
| 56-149676 | 11/1981 | Japan . | |
| 57-17041 | 1/1982 | Japan | G06F 1/00 |
| 57-55482 | 4/1982 | Japan . | |
| 57-105090 | 6/1982 | Japan . | |
| 58-12064 | 1/1983 | Japan | G06F 15/20 |
| 58-19940 | 2/1983 | Japan . | |
| 58-96382 | 6/1983 | Japan . | |
| 58-114287 | 7/1983 | Japan | G06K 11/06 |
| 58-140883 | 8/1983 | Japan . | |
| 58-144276 | 8/1983 | Japan . | |
| 58-144287 | 8/1983 | Japan . | |
| 58-186882 | 10/1983 | Japan . | |
| 58-208865 | 12/1983 | Japan . | |
| 59-24387 | 2/1984 | Japan | G06K 11/06 |
| 59-27382 | 2/1984 | Japan . | |
| 59-35277 | 2/1984 | Japan . | |
| 59-66744 | 4/1984 | Japan . | |
| 59-91585 | 5/1984 | Japan . | |
| 59-151227 | 8/1984 | Japan . | |
| 59-176865 | 10/1984 | Japan . | |
| 60-29828 | 2/1985 | Japan . | |
| 60-50589 | 3/1985 | Japan . | |
| 60-75980 | 4/1985 | Japan . | |
| 60-91438 | 5/1985 | Japan . | |
| 60-160432 | 8/1985 | Japan . | |
| 60-164863 | 8/1985 | Japan . | |
| 60-221794 | 11/1985 | Japan . | |
| 60-222916 | 11/1985 | Japan . | |
| 60-250461 | 12/1985 | Japan | G06F 15/20 |
| 61-20120 | 1/1986 | Japan . | |
| 61-33163 | 2/1986 | Japan . | |
| 61-77990 | 4/1986 | Japan . | |
| 61-107468 | 5/1986 | Japan . | |
| 61-88323 | 5/1986 | Japan . | |
| 61-114387 | 6/1986 | Japan . | |
| 2102944 | 2/1983 | United Kingdom . | |
| 2117154 | 10/1983 | United Kingdom . | |
| 2193023 | 1/1988 | United Kingdom . | |

OTHER PUBLICATIONS

Doster, W., et al. "Word–Processing with On–Line Script Recognition", *IEEE Micro*, vol. 4, No. 5, pp. 36–43 (1984).

Terai, H., et al. "Text Editing System Using On–Line Real–Time Character Recognition," Info. Proc. Society of Japan, vol. 15, No. 6, pp. 419–427 (1974).

Kankaanpää, A., "An Advanced Display System with Natural Interactivity", Eurographics 86: Proceedings of the European Computer Graphics Conference and Exhibition, pp. 185–193 (1986).

Toida, T. et al., "A Method for Correcting Characters in On–Line Handwritten Input", Showa 58–nendo Denshi Tsushin Gakkai Sogo Zenkoku Taikai, (Apr. 1983).

Wakahara, T., et al., "Electro–Luminescent Display Superimposed by Transparent Electromagnetic Coupling Tablet and Its Application To Script Input Japanese Word Processor", (no date), pp. 981–988.

Fukunaga, Y., et al., "A Man–Machine Interface with a Handwritten Input Device", Technical Research Report of Electronics and Communication Society, Japan, vol. 86, No. 26, pp. 25–29 (no date, no translation).

"Program Recognizes Handwritten Math", *Electronics Review*, vol. 44, No. 18, Aug. 30, 1971.

Suen, C., et al., "Automatic Recognition of Handprinted Characters", *Proceedings of the IEE*, vol. 68, No. 4, Apr. 4,1980.

Brown, R., "Hand Printed Symbol Recognition System: A Very High Performance Approach to Pattern Analysis of Free–Form Symbols" IEEE Southeast Conference, 1981, pp. 291–198.

Yoshida, K., On–Line Handwritten Character Recognition for a Personal Computer System:, *IEEE Transactions on Consumer Electronics*, vol. CE–28, No. 3, Aug., 1982, pp. 202–209.

Ye, P., "Techniques for On–Line Chinese Character Recognition with Reduced Writing Constraints", 7th Intrnational Conference on Pattern Recognition 1984, vol. 2, pp. 1043–1045.

Wakahara, T., "On–Line Cursive Script Recognition Using Stroke Linkage Rules", *7th International Conference on Pattern Recognition*, 1984, vol. 2, pp. 1065–1068.

Oed, R., et al., "On–Line Script Recognition—A User Friendly Mann Machine Interface", *IEEE 1985 COMPINT: Computer Aided Technologies*, Sep. 8–12, 1985, pp.741–743.

Okudaira, M. "Image Recognition and Display–Based Interactive Processing for Plant–Record Drawing Database", *IEEE Global Telecommunications Conference, Dec. 2–5, 1985, New Orleans, Louisiana*, vol. 2, pp. 625–629.

Tappert, C., et al., "Handwriting Recognition on Transparent Tablet Over Flat Display ", *1986 SID Internation Symposium, Digest of Technical Papers*, pp. 308–312.

Okudaira, M., et al. "Image Enhancement of Handwritten Drawings and Their Recognition Followed by Interactive Processing", Proc. Spie. Int. Soc. Opt. Eng., vol. 707, pp. 42–50, (1986).

O'Callaghan, "Problems in On–Line Character Recognition", *Picture Language Machines—Proceedings of a Conference*, Feb. 1969, Canberra, Australia, pp. 193–211.

Davis, M.R., et al., "The Rand Tablet: A Man–Machine Graphical Communication Device," The Rand Corporation, Santa Monica, California, AFIPS Conference Proceedings, vol. 26, 1964, Fall Joint Computer Conference, pp. 325–331.

P.G. Moulton et al., "Graphical Input/Output for the Character Recognition Program," *The Macaroni Review*, vol. 34, No. 181, 1971 pp. 113–120.

Gubeman, S., et al., "Algorithm for the Recognition of Handwritten Text", *Automation and Remote Control*, vol. 37, No. 5, Part II May 1976, pp. 751–757.

Warfield, R. "The New Interface Technology An Introduction to Windows and Mice", *Byte*, vol. 8, Dec. 1983, pp. 218–230.

Coleman, M. "Text Editing on a Graphic Display Device Using Hand–Drawn Proofreader's Symbols", *Pertinent Concepts in Computer Graphics*, 1969.

D. Smith et al., "Designing the Star User Interface," Byte, pp. 242–282, Apr. 1982.

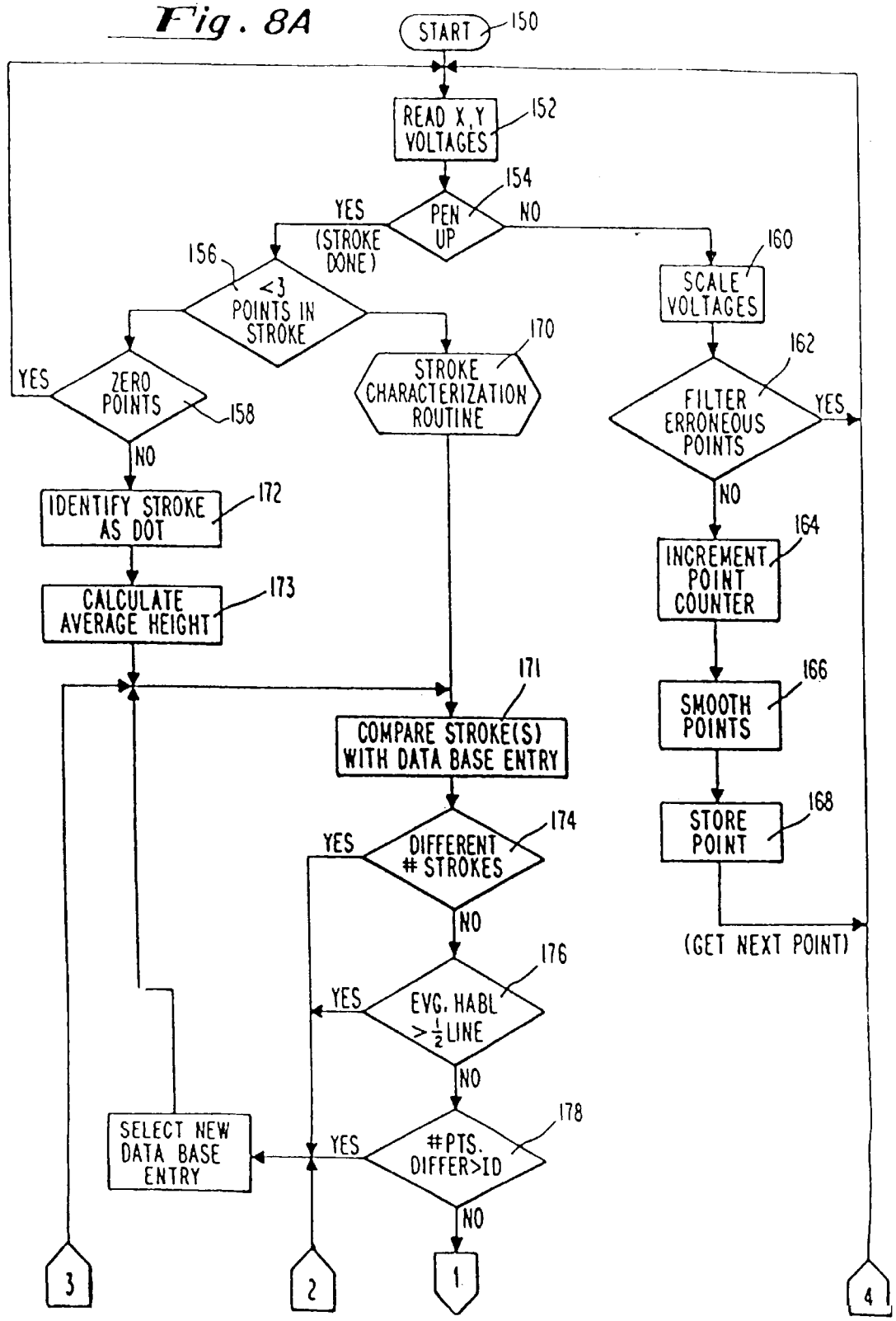

FIG. 11A

I - Printed Circuit Board

The board's size, cost, power consumption, and reliability are critical to the success of our product.

The board must fit in our package, which limits its dimensions to something like 10" X 5", or about 50 square inches. Room must be available for dealer installable options such as additional memory and modem – possibly as piggy back board. ∧

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we will be using CMOS technology throughout. We also expect to use Surface Mounted Technology (SMT). SMT allows a denser packing, more shock resistence and lower manufacturing costs, although initial costs may be slightly higher. The final decision on SMT will depend upon the availability of

FIG. 11B

I - Printed Circuit Board

The board's size, cost, power consumption, and reliability are critical to the success of our product.

The board must fit in our package, which limits its dimensions to something like 10" X 5", or about 50 square inches. Room must be available for dealer installable options such as additional memory and modem – possibly as piggy back board. ∧

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we

FIG. 11C

---
I - Printed Circuit Board

The board's size, cost, power consumption, and reliability are critical to the success of our product.

The board must fit in our package, which limits its dimensions to something like 10" X 5", or about 50 square inches. Room must be available for dealer installable-options such as additional memory and modem – possibly as piggy back board. ∧

*now is the time*

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we

---
I - Printed Circuit Board

The board's size, cost, power consumption, and reliability are critical to the success of our product.

The board must fit in our package, which limits its dimensions to something like 10" X 5", or about 50 square inches. Room must be available for dealer installable options such as additional memory and modem – possibly as piggy back board. ∧

Now is the time

*now is the time*

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we

FIG. 11E

I - Printed Circuit Board

The board's size, cost, power consumption, and reliability are critical to the success of our product.

The board must fit in our package, which limits its dimensions to something like 10" X 5", or about 50 square inches. Room must be available for dealer installable options such as additional memory and modem — possibly as piggy back board. Now is the time Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we will be using CMOS technology throughout. We also expect to use Surface Mounted Technology (SMT). SMT allows a denser packing, more shock resistence and lower manufacturing costs, although initial costs may be slightly higher. The final decision on SMT will depend upon the availability of

FIG. 11F

I - Printed Circuit Board

The board's size, cost, power consumption, and reliability are critical to the success of our product.

The board must fit in our package, which limits its dimensions to something like 10" X 5", or about 50 square inches. Room must be available for dealer installable options such as additional memory and modem — possibly as piggy back board. ~~Now is the time~~

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

Given our cost and power requirements we expect that we will be using CMOS technology throughout. We also expect to use Surface Mounted Technology (SMT). SMT allows a denser packing, more shock resistence and lower manufacturing costs, although initial costs may be slightly higher. The final decision on SMT will depend upon the availability of

FIG. 11G

> I - Printed Circuit Board
>
> The board's size, cost, power consumption, and reliability are critical to the success of our product.
>
> The board must fit in our package, which limits its dimensions to something like 10" X 5", or about 50 square inches. Room must be available for dealer installable options such as additional memory and modem — possibly as piggy back board.
>
> Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.
>
> Given our cost and power requirements we expect that we will be using CMOS technology throughout. We also expect to use Surface Mounted Technology (SMT). SMT allows a denser packing, more shock resistence and lower manufacturing costs, although initial costs may be slightly higher. The final decision on SMT will depend upon the availability of

FIG. 11H

> I - Printed Circuit Board
>
> The board's size, cost, power consumption, and reliability are critical to the success of our product.
>
> The board must fit in our package, which limits its dimensions to something like 10" X 5", or about 50 square inches. Room must be available for dealer installable options such as additional memory and modem — possibly as piggy back board. Now is the time
>
> Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.
>
> Given our cost and power requirements we expect that we will be using CMOS technology throughout. We also expect to use Surface Mounted Technology (SMT). SMT allows a denser packing, more shock resistence and lower manufacturing costs, although initial costs may be slightly higher. The final decision on SMT will depend upon the availability of

FIG. 11I

I - Printed Circuit Board

The board's size, cost, power consumption, and reliability are critical to the success of our product.

The board must fit in our package which limits its dimensions to something like 10" X 5", or about 50 square inches. Room must be available for dealer installable options such as odditonal memory and modem — possibly as piggy back board.

Power consumption must be low enough so that the batteries in the product can provide for about 8 hours of operation and about 2 weeks of data retention. These are exclusive, i.e. 8 hours of operation followed by 2 weeks of data retention is required. With this kind of power consumption heat should not be a problem.

FIG. 12A

Name: .............. ID#: ..... Room: ........

Doctor: ..................................... Bed: .....
PATIENT INFORMATION
Weight: 0.0  Height: 0.0  Sex: male female

|  | Temp | Pulse | B/P | Resp | Intake | Output |
|---|---|---|---|---|---|---|
| Mn | 0.0 | 0.0 | 0.0 | 0.0 | 0.0 | 0.0 |
| 04:00 | 0.0 | 0.0 | 0.0 | 0.0 | 0.0 | 0.0 |
| 08:00 | 0.0 | 0.0 | 0.0 | 0.0 | 0.0 | 0.0 |
| 12:00 | 0.0 | 0.0 | 0.0 | 0.0 | 0.0 | 0.0 |
| 16:00 | 0.0 | 0.0 | 0.0 | 0.0 | 0.0 | 0.0 |
| 20:00 | 0.0 | 0.0 | 0.0 | 0.0 | 0.0 | 0.0 |

Observations        0.0    0.0

QUIT    REDRAW    CALIBRATE    MEMO

FIG. 12B

QUIT　　REDRAW　　CALIBRATE　　MEMO

FIG. 12C

CANCEL　　HATCH　　INSERT　　CLEAR

FIG. 12D

[Figure showing stacked patient information windows with fields for Name, ID#, Room, Doctor, Bed, Weight, Height, Sex, and a table with columns Temp, Pulse, B/P, Resp, Intake, Output for times Mn, 04:00, 08:00, 12:00, 16:00, 20:00, with Observations row. A value "98" is shown in an inset box under Pulse. Bottom buttons: CANCEL, HATCH (highlighted), INSERT, CLEAR]

FIG. 12E

[Similar stacked patient information windows with the "98" value shown in two boxes under Pulse. Bottom buttons: CANCEL, HATCH, INSERT, CLEAR]

HANDWRITTEN KEYBOARDLESS ENTRY COMPUTER SYSTEM

This application is a continuation of U.S. patent application Ser. No. 08/377,298, filed Jan. 23, 1995, which is a continuation of U.S. patent application Ser. No. 08/190,745, filed Jan. 31, 1994, now abandoned, which is a continuation of U.S. patent application Ser. No. 07/775,167, filed Oct. 11, 1991, now U.S. Pat. No. 5,297,216, issued Mar. 22, 1994, which is a division of U.S. patent application Ser. No. 07/523,447, filed May 14, 1990, now U.S. Pat. No. 5,157,737, issued Oct. 20, 1992, which is a continuation of U.S. patent application Ser. No. 07/029,772, filed Mar. 24, 1987, now U.S. Pat. No. 4,972,496, issued Nov. 20, 1990, which is a continuation-in-part of U.S. patent application Ser. No. 06/889,513 filed Jul. 25, 1986, now abandoned.

REFERENCE TO DISCLOSURE DOCUMENT

Reference is hereby made to Disclosure Document No. 144,644, filed Jan. 14, 1986.

FIELD OF THE INVENTION

The present invention relates generally to a keyboardless input system to a computer, and when combined with a central processing unit, to a keyboardless entry computer system. More particularly, the present invention relates to an information storage, manipulation and transfer device on which text, data, computer commands and functions are entered by writing alphanumeric or any other characters and symbols by hand with a penlike stylus on an Input/Output (I/O) screen. In a preferred embodiment the I/O screen includes a transparent touch screen incorporated over a substantially flat output display. The present invention in its preferred embodiment is a self-contained computer system but can also function as a peripheral to a host computer.

DESCRIPTION OF THE PRIOR ART

Large amounts of information and sophisticated applications software are now available on conventional keyboard computers. The utility of this information and of application software could be greatly increased if text and data could be entered and applications software manipulated by writing in a normal fashion directly on a flat display. Thus, there is a need to allow the utility of computer technology to be extended for use by non-keyboard oriented individuals. There is also a need for a portable computer system that is lightweight, reliable, accurate, inexpensive and permits use while standing or walking. One way to reduce expense and size and increase utility is to employ a keyboardless entry system, such as a touch screen. However, this type of input device does not easily allow accurate detailed input within a real time framework with high resolution in a manner which is familiar and natural to the user.

Many positioning technologies can be used to meet the requirements of the position sensing input technology. Essentially these requirements include accuracy, resolution and speed. The technologies include: mechanical, electrostatic, electromagnetic, acoustic, optical, and inertial. The desire in this system is to have its use as similar as possible to writing with pen or pencil on paper. One problem is proximity - - - a pen on paper only leaves a trail when actually in contact. Many of these technologies require an additional "pen down" sensor which is awkward to use in many commercial pens. Another problem is writing angle - - - a pen leaves the same trail independent of writing angle. Many of these technologies have the position detector displaced from the pen tip, so pen angle causes erroneous displacements. Beyond these general problems, each technology has numerous advantages and disadvantages in (1) the pen: size, weight, shape and whether it needs to be powered and/or wired, and (2) the writing surface: transparency, smoothness, "feel", and whether or not physical contact is needed (as opposed to pressure transmitted through overlaying sheets of paper).

A number of self-contained devices for viewing and processing large amounts of information are known. Most employ optical, magnetic or solid-state electronic storage means to store data. Illustrative of this body of art is U.S. Pat. No. 4,159,417 to Rubincam which discloses a portable electronic book configured to provide selective page by page call-up of large amounts of digital data and displays it on a flat, solid-state screen. The preferred embodiment in the Rubincam patent uses an insertable holographic card, which may contain several hundred pages of text in digital form, as the main storage means. Rubincam's device, however, does not allow new information or text to be entered or manipulated.

In U.S. Pat. No. 4,016,542 to Azure an electronic data collection system is disclosed which employs a solid state Random Access Memory (RAM) for its primary memory. This patent, which discloses a conventional keyboard for data entry, is directed to a hand-held portable data storage and transmission system, as well as an LED display and various Input/Output (I/O) connectors.

U.S. Pat. No. 3,487,731 to Frank discloses a means of converting handwriting into character data through the use of a computer system. The disclosed invention is based on matrix pattern matching and does not employ any coincident display technology.

U.S. Pat. No. 4,491,960 to Brown shows a handwritten symbol recognition system in which an array of image Points, in the form of a raster line sampling, is converted into segment-oriented lists which are filtered and compressed to obtain topologic features which are then analyzed with a logic tree decision mechanism.

U.S. Pat. No. 4,262,281 to Buckle et al. discloses a handwriting recognition device. The disclosed embodiment is for use with a host computer and does not employ coincident display technology.

U.S. Pat. No. 4,475,239 to Van Raamsdonk discloses a text editing apparatus. The '239 patent calls for the use of paper as a medium for the entering of editing functions and requires a conventional keyboard for the inputting of text.

U.S. Pat. No. 4,521,909 to Wang shows a dual level pattern recognition system. The system is designed for use with an optical instrument.

U.S. Pat. No. 4,520,357 to Castleberry et al. discloses an electroscopic information display and entry system with writing stylus. The disclosed embodiment does not claim to have the speed or accuracy to enable handwritten character recognition.

Additional prior art which discloses portable electronic devices that provide large amounts of various types of stored information include U.S. Pat. Nos. 4,218,760 to Levy; 4,4115,486 to Laine; and 3,932,859 to Kriakides et al. The Levy and Kriakides et al. patents pertain to electronic dictionaries, while the Laine patent discloses a programmable television reminder system. None of these devices disclose the use of a handwritten input.

In U.S. Pat. Nos. 4,071,691, 4,129,747, 4,198,539, 4,293,734, 4,302,011, 4,353,552, 4,371,746 and 4,430,917 to William Pepper, Jr. various methods or machine-human interfaces using finger touch are disclosed. The preferred embodiments in each of these inventions lack sufficient speed and resolution to allow handwritten character recognition with a stylus and are designed for other purposes. U.S. Pat. No. 4,318,096 to Pepper teaches the use of a conductive stylus. The '096 patent pertains to graphic design and allows line width and line intensity to vary by applying pressure on the stylus with the results displayed on a conventional CRT screen. U.S. Pat. No. 3,699,439 to Turner and U.S. Pat. No. 4,055,726 to Turner et al. disclose two methods for electronic position sensing through the use of a probe.

SUMMARY OF THE INVENTION

The invention comprises a unique keyboardless computer system which has the ability to recognize and display Handwritten Symbols and cause the computer to display Font Symbols and, if desired, to execute editing functions pursuant to Editing Symbols, quickly, easily and at reasonable cost.

The invention constitutes a computer housing with a flat display panel on which a user may "write" with a stylus, a capability to recognize Handwritten Symbols written on the panel with the Stylus and convert them to displayed Font Symbols and/or to execute Editing Functions with Editing Symbols, all with a minimum of technical complexity for the user.

A further feature of this invention is that once the keyboardless, portable computer is loaded with the desired information and applications software, information and software can be used and responded to without requiring skills or knowledge related to state-of-the-art computers or other data source.

The ease-of-use of the input technology of the present invention enhances the utility of the computer for keyboard oriented individuals. The portability of the present invention also allows it to be used in applications and settings in which portable keyboard computers are awkward, difficult or impossible to use. For example, a multiplicity of blank, fully or partly completed forms may be stored in the portable computer memory. In a hospital, "sheets" of patient data can be stored in the memory of the portable computer, called up by a nurse as the nurse makes rounds and relevant data, such as blood pressure, temperature, etc., can then be entered manually with a stylus. These corrected or expanded forms can then be down-loaded into a central computer memory.

The requirements of the position sensing input technology are accuracy (Point to Point), resolution (absolute position) and speed (Points per unit time) to adequately define the written Stroke for recognition analysis. For the recognition apparatus and methods presently used, as described below, the present minimum requirements are: accuracy of 0.005 inch, resolution of 0.015 inch, and speed of 150 Points per second. This accuracy allows a ¼" high writing line with over 10 raw input Points along a Stroke of a small letter. The resolution provides positioning of the symbol to within two pixels on a present display of 640 pixels to 9 inches. The speed permits about 50 raw input Points for a rapidly written single letter (⅓ second).

One embodiment of the present invention comprises a transparent input screen. As the user writes alphanumeric or other characters or symbols on the input screen, the character is represented as a stream of Points emulating written input with pen on paper. Once the discrete alphanumeric and other characters or symbols are complete, they are translated into computer text or computer commands that can be displayed on a display screen at a location that is preferably beneath the area on the input screen where they were entered. The embodiment also comprises a pattern recognition algorithm which allows the translation of any written character or symbol, such as ideographs and scientific symbols, into computer text.

In a particular, presently preferred embodiment, a keyboardless computer according to the present invention is configured as a manipulation and display device comprising a transparent touch screen and associated electronics placed over an 80 column by 25 line or larger display screen; a stylus for entry of data; a microprocessor and storage means; artificial intelligence/pattern recognition software and editing software; and a battery power system; and other I/O means.

As used herein, "Handwritten Symbols" are any symbols capable of being handwritten and having communicative effect. By way of example, and not limitation, numbers, letters, "Kanji" (Japanese ideograms) or other language symbols, editing symbols and engineering, scientific, architectural and mathematical symbols are Handwritten Symbols. Other examples of Handwritten Symbols are free-hand drawings or signatures or any other such written information uniquely configured by a particular writer. Handwritten Symbols may also include Editing Symbols (defined below).

As used herein, "Font Symbols" are computer-generated symbols which are displayed in a predetermined font format. By way of example and not limitation, alphanumeric symbols may be Font Symbols and displayed in numerous font formats. Japanese or Chinese "ideograms" may also be Font Symbols, as may be engineering, scientific, mathematical, architectural or other such characters. Other examples of Font Symbols include any form which can be stored and displayed by a computer, e.g., a drawing of a car or a house.

As used herein, an "Editing Symbol" is a symbol (such as a caret, horizontal line, short vertical line, long vertical line, etc.) which is intended, when recognized, to cause the computer to execute a particular Editing Function (defined below), such as insert text (caret), delete text (horizontal line), delete a letter (short vertical line) or move a margin (long vertical line), to list a few representative examples.

"Editing Function" means any computer-generated text editing operation, such as by way of example and not limitation, insert text, delete text, move text and substitute text. Some primary Editing Functions are listed below.

OBJECTS OF THE INVENTION

It is therefore a primary object of the present invention to provide improved methods and apparatus for providing a keyboardless computer on which usual computer functions are performed by writing in a normal manner with a pen-like stylus on an input screen placed directly over a flat display.

The keyboardless computer provided is ideally configured for use by non-keyboard oriented individuals, by keyboard individuals for whom the utility of the computer is enhanced, and in various settings and applications in which keyboard entry is awkward or impossible.

It is also an object of this invention to provide a means whereby computer-based information and applications software can be loaded into a portable device for later viewing, manipulation of text and data, and adding new text and data in a normal handwriting mode. Thereafter the user may transmit this computer text to another computer, a similar device, an external electronic storage device, a hard copy printer, or through a telecommunications system. Yet another object of thus invention is to provide a computer capable of recognizing Handwritten Symbols with a high degree of accuracy and of "learning" individual styles of handwriting.

A further object of this invention is to provide a portable keyboardless computer in which data and commands are input with the use of a stylus.

BRIEF DESCRIPTION OF THE DRAWINGS

FIGS. 8A and 8B together are a detailed block diagram of the pattern recognition algorithm.

FIGS. 11A through 11I are a series of top plan views of screens depicting the operation of a text editing system.

FIGS. 12A through 12G are a series of top plan views of screens depicting the operation of a data entry system.

DETAILED DESCRIPTION OF THE PREFERRED EMBODIMENTS

Figure 1:
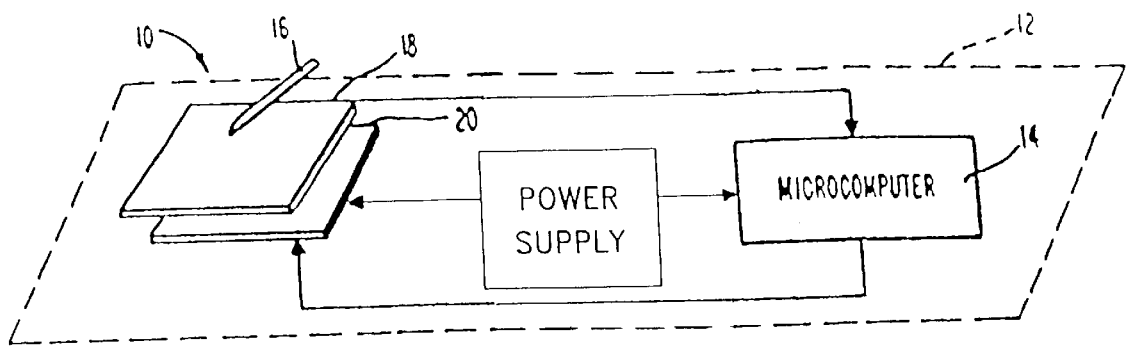
FIG. 1 is a schematic system block diagram of the present invention.
Figure 2:
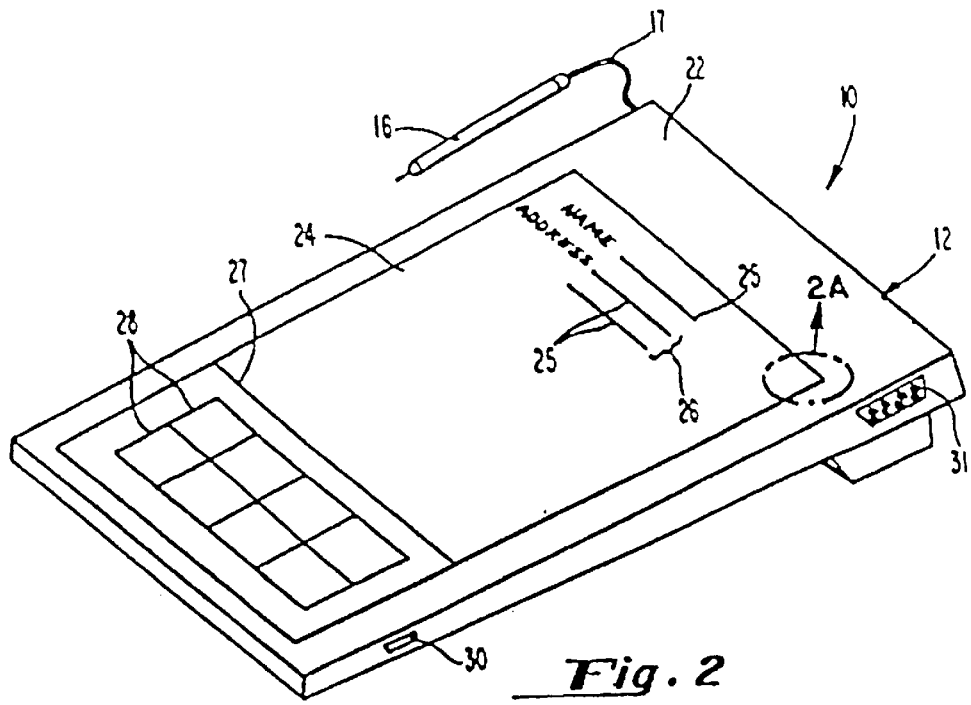
FIG. 2 is a perspective view of the housing containing the operating elements of the invention.

With reference now to the figures, wherein like numerals indicate like elements throughout the several views, and in particular with reference to FIG. 1, an overall block diagram of a portable handwritten, keyboardless entry computer system 10 is depicted. The complete computer system is encased in a housing 12, indicated graphically by the dashed line, and includes a conventional, general purpose digital microcomputer 14, described in greater detail hereinbelow. Input information is provided to microcomputer 14 by stylus 16 "writing" on writing or input screen 18. Stylus 16 (FIG. 2) is connected to the computer of system 10 with wire 17 (FIG. 2). As stylus 16 "writes" on input screen 18, a plurality of locating signals representative of a plurality of corresponding positional coordinates are transmitted to microcomputer 14. Microcomputer 14 has been programmed in accordance with a computer program described hereinbelow, to recognize the stream of locating signals and to store these signals in a computer memory. The programmed microcomputer 14 also provides a corresponding plurality of display signals to a display screen 20. Both input screen 18 and display screen 20 are described in greater detail hereinbelow.

Figure 2A:
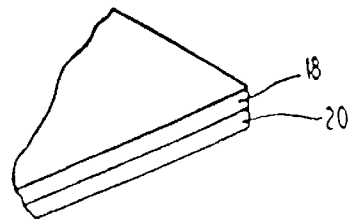
FIG. 2A is an enlarged portion of FIG. 2, with parts removed to show the positional relationship between the touch input screen and the display screen.

Referring now to FIG. 2, there is shown a perspective view of keyboardless computer system 10 embodying the features of the present invention. Keyboardless computer system 10 is contained in housing 12, which is a rectangular enclosed casing having a sloped top surface 22 with a multi-line, solid state display area 24. Input screen 18 is depicted in FIG. 2A as being positioned over display screen 20. In this example, display screen 20 displays a plurality of horizontal lines 25 with the following indicia:

Name Address

Handwritten entries are made above each line 25. The distance or space between two lines 25, denoted 26, is used by the system to normalize all distances, and lines 25 themselves serve as a reference axis or base line.

Below display area 24 on top surface 22 is a key input section 26 comprised of a plurality of "Softkeys" 28. Softkeys 28 can be programmed by the operator for any purpose, such as to enter computer commands. Exemplary commands for Softkeys 28 are "store," "recall," and "delete." In addition, Softkeys 28 can be used to switch between different programs or between modes (e.g. data entry mode and edit mode). However, Softkeys 28 are optional and are used to supplement the input obtained by handwriting the entries. Stylus 16, used for writing input data and commands in display area 24, also is used to activate the selected Softkey 28. An ON-OFF switch 30 is positioned on the side of housing 12 adjacent to Softkeys 28. A data output or peripheral connector 31 is located on the upper right side of housing 12.

Input screen 18 can be a conventional resistive type touch screen in which a voltage is applied to the screen edges and a stylus detects the voltage at the touched location. The writing surface is a transparent material, typically glass, coated with a thin, uniform, conductive layer (presently, vacuum deposited indium tin oxide). Vertical bus bars or conducting strips (not shown) are used along the two sides to apply the reference voltage to determine the "X" coordinates of the stylus position and horizontal bus bars or conducting strips (not shown) are used along the bottom and top to apply the reference voltage to determine the "Y" coordinates of the stylus position. In this embodiment, stylus 16 is merely an electric probe that, when physically in contact with the conductive layer, detects the local voltage at the Point of contact, which will vary with the distance from the conducting strips or bus bars. With the origin at the Point of voltage application, the X, Y coordinates are inversely proportional to the impressed voltage. Stylus 16 must make good contact to minimize adding resistance that would lower the voltage detected, and thus add an erroneous distance increment. In a presently preferred embodiment, a soft graphite tip is used. The voltage is conducted from the pen through a wire, such as wire 17 in FIG. 2, to an analog to digital converter for use in the computations described below. The stylus may be a charged "pen" as described herein, a light pen as is well known in the art, or any other hand-held device which can outline Handwritten Symbols on a screen.

An example of a conventional electrostatic screen is disclosed in the aforementioned U.S. Pat. No. 4,318,096 Pepper patent. This resistive type screen has the advantage that the interference caused by the user's hand touching the screen is minimized.

Both horizontal and vertical position sensing is provided by alternately switching the voltage impressed on a conductive layer between the pairs of horizontal and vertical bus bars by an interface and multiplexer controlled by a microcomputer or microcontroller. In one commercially available input or touch screen, the bus bars are broken into a series of short strips with diodes to prevent the horizontal strips from shorting out vertical strips and vice versa. This technique is used in a commercially available touch screen from Touch Technologies of Annapolis, Md. and Elographics of Oak Ridge, Tenn.

Figure 3:
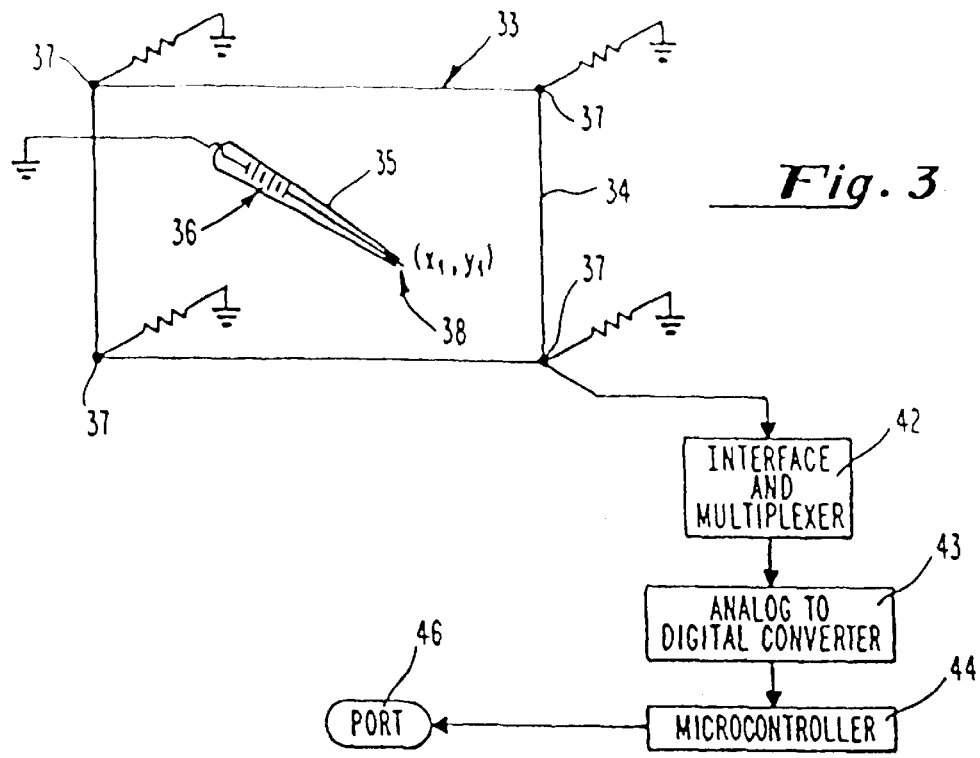
FIG. 3 is a schematic diagrammatic view of the input screen, stylus and associated electronics.

Referring now to FIG. 3, an alternate embodiment of a low power position sensing novel input screen 33 is described in greater detail. Input screen 33 is also for determining an X, Y position on an electrically resistive plate 34. A stylus 35 containing a voltage source, such as battery 36 or a voltage transmitted to stylus 35 from an external source such as the system power supply, is used to touch screen 34 and apply a voltage at the touched position. When the touched position is charged by stylus 35 with a positive voltage with respect to a plurality of plate measurement Points 37, the voltages at these Points will vary with the distance to the pen position, such as position X1, Y1, indicated at 38. These voltages are sequentially measured in the X and Y directions by using conventional means, such as disclosed in the aforementioned prior art patents. In FIG. 3 these means are a conventional interface/multiplexer 42. A conventional Analog-to-Digital converter 43 converts the detected voltages into a digital signal. A microcontroller 44 receives the digital signal, performs standard checks to insure the signal's numerical value is "valid" (e.g. is within the possible range of voltages), and then converts the voltages to X and Y distances in the manner described herein. Microcontroller 44 is conventional, but could be replaced by a system computer. Microcontroller 44 provides a digital signal representative of the X and Y distances to measuring Point 38 to an output port 46. Port 46 can be a conventional RS 232 port. Alternatively, microcontroller 44 could translate Point X1, Y1 to any other reference Point, such as a Point on base line 25 (FIG. 2).

As long as there is no contact by stylus 35 at position 38 or any other position on plate 34, no current flows and power consumption is minimal. An incident measurement of the voltage at the measurement Points may occur by using ramped voltage at the positioning Point and timing when the measuring Point voltage exceeds a preset back voltage.

The scope of this invention covers the following options for the input or touch screens 18 and 33: resistive plate 34 or its equivalent for screen 18 can be transparent or translucent and the position Point can be made by a stylus or a finger of the user, or a connecting Point of an overlapping conductive screen (such as the commercially available touch screens from Touch Technology, Annapolis, Md.). Input screens 18 and 33 can be a physical solid surface which is transparent or translucent and can be glass or plastic such as Mylar. The surface can be coated with a conductive/resistive substance like indium tin oxide. Other physical surfaces can use sound or electromagnetic radiation transmission from the touched position to a reference Point or Points and the distance is determined by the time delay or phase shift. Alternatively, input screens 18 and 33 can use an ethereal or geometric surface defined by an electromagnetic, optical or sonic field.

Position detection can be accomplished with electrical contact closure by resistive, capacitive or inductive coupling, remote sensing by sonic, electric or magnetic fields or by light (UV, IR, or microwave) scanning.

The advantages of the low power position sensing input invention over other such screens are: 1) the invention makes stand-by power requirements minimal; 2) the invention eliminates distortion due to opposing parallel "bus" bars in conventional touch screens; and 3) when a ramped voltage is employed, the invention eliminates the need for an A/D chip which is a major cost factor in state-of-the-art touch screen technology.

The coefficient of friction of the screen 18 is desirably selected to be "rough" enough to offer some resistance to the movement of stylus 16 on the screen. If the screen were too smooth, the stylus would slide too easily and would be difficult to control.

Figure 4:
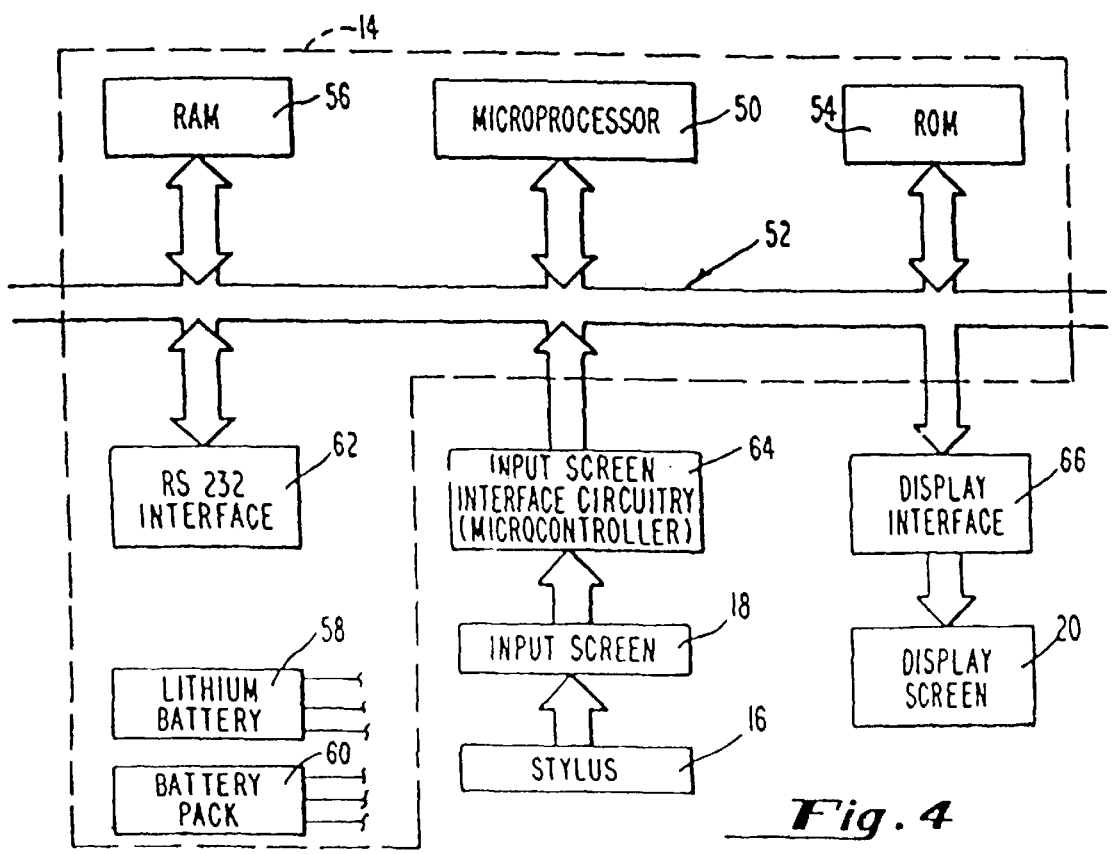
FIG. 4 is an overall schematic system block diagram of the apparatus of a keyboardless entry computer system according to the present invention.

Reference is now made to FIG. 4 which discloses an overall system block diagram of the major electronic circuitry used in the preferred embodiment of the present invention. Microcomputer 14 includes a microprocessor 50, interconnected to a plurality of other electronic elements by means of data path or bus 52. A Read-Only-Memory (ROM) 54 which is programmed with the operating and application programs and a battery powered Random Access Memory (RAM) 56 is connected for bidirectional data flow onto bus 52. Microprocessor 50 may be a conventional single-chip eight-bit or sixteen-bit device which functions to execute the fixed control programs residing in ROM 54, and further receives control programs from and provides control signals to the other electronic elements via bus 52. Microprocessor 50 may be of the type commercially designated Z80 (manufactured by Zilog Microcomputers of Cupertino, Calif.), of a type 8088 device (manufactured by Intel Corp. of Santa Clara, Calif.) or any similar or more powerful microprocessor. ROM 54 may be of the type 2564 or 4764, both manufactured by Texas Instruments of Dallas, Tex. The storage capacity of RAM 56 is determined in part by the sizes of the application programs, the operating program and the database. As discussed below, RAM 56 may be of the static SRAM or dynamic DRAM type. The primary requirements of RAM 56 are that it have sufficient storage capacity and that it require a minimum of input power.

A battery 58, such as a lithium battery, provides power for making the memory of RAM 56 non-volatile for extended periods of time. A battery pack 60 containing the well-known rechargeable types of batteries is used to provide the various voltage levels required by the other electronic elements of microcomputer 14.

Alternately, the storage function of RAM 56 may be served by a non-volatile device which requires no power for maintaining storage, such as an electronically erasable and reprogrammable memory (EEPROM), or devices using magnetic bubbles or capacitance. State-of-the-art disk or tape may also be used for mass storage. Suitable bubble memory devices include types 7110 and 7114 which have storage capacities of 1 megabit and 4 megabits respectively. (Both are manufactured by Intel Corp.) . Furthermore, it is possible to use a single integrated circuit chip which includes microprocessor at least part of ROM 54 and at least part of RAM 56.

Also connected to bus 52 is an EIA RS-232 serial interface 62 which provides a means for inputting and outputting data. Data is provided to bus 52, (usually to RAM 56) by interconnecting an external data source to RS-232 port 62 directly to the microprocessor 50 and other elements of the microcomputer 14. Offloading data from RAM 56 can also be done by microprocessor 50 to an external computer, other data gathering device, a mass data storage device (e.g. floppy and hard disk drives) or an electronic telecommunications system. In like manner data can be communicated through port 62 to a printer (not shown) from interconnecting bus 52.

Stylus 16 is used to write on input screen 18 and to cause the generation of X, Y coordinate information by conventional touch screen interface electronics circuitry. The coordinate information is communicated via the bus 52 for control use by system 10. The solid state display 20 consisting of a multi-line display - - - illustratively 80 columns by 25 lines-is interconnected to bus 52 through a display interface 66. The fundamental requirements for the display are that it be substantially flat and sufficiently thin for use in the present invention. The display may be of the following types: scanning types such as a cathode ray tube, projected types such as a rear-view projector, light emitting array of Points types (e.g., electroluminescent or plasma discharge) and light blocking array of Points types (e.g., liquid crystal displays, solid state PLTZ or magneto-optical). In addition, it is preferable that the display be compatible with input screen 18 in size, configuration and transparency, and that both be low power consuming types.

The X, Y coordinates for this invention are input to keyboardless computer 14 via input screen interface electronics 64 and communicated via bus 52 to microprocessor 50 which executes programs stored in ROM 54 and RAM 56.

The number of Points (i.e., sets of X, Y coordinates) used in defining each Handwritten Symbol and the speed at which Points are identified are important to the practical utility of the invention. It is desirable to use at least about 100 Points per inch and at least about 100 Points per second to define Handwritten Symbols. It is to be noted that the more Points per inch that are identified, the greater the accuracy of the system in identifying Handwritten Symbols - - - however, more Points being identified will slow down the speed of identification and require more computer memory. Accordingly, a balance will have to be achieved, based on the size (available memory and processing ability) of the computer system and the requirement for speed of response and accuracy. For most purposes, standards in the range from about 100 Points per inch and per second to about 200 Points per inch and per second will be suitable.

It is also to be noted that the greater the precision of the system in identifying the X, Y coordinates of each Point the fewer the number of Points needed to be identified per inch and per second to accurately identify Handwritten Symbols. Conversely the less the accuracy, the more Points that are needed.

Point resolution is needed to place Points where intended, e.g., to write an editing symbol precisely between the two characters. Ideally, resolution to a single display pixel is desirable. However, operationally, resolution within two displayed pixels is sufficient for a display with 640 pixels in a nine inch horizontal scanline.

When switch 30 (FIG. 2) is positioned to "power on", the basic display mode is activated and microcomputer 14 (FIG. 4) programmed by the operating system, causes a menu to be displayed on display screen 20 (FIG. 1). The menu presents various software options. A primary software function, editing, functions in a manner similar to conventional word processing software with the difference being that handwritten characters, symbols and commands are interpreted by the system as if they were entered from a conventional keyboard. The system is capable of learning the editing symbols used by a particular writer for functions such as indent, insert, delete, move and reformat and translates those symbols into digital command functions. Optionally, Softkeys 28 (FIG. 2), activated by touching those areas on the input screen with stylus 16, function like conventional hard function keys on a computer keyboard.

The present invention is particularly adapted for use as an interactive screen editor or word processor. After a writer retrieves a document by (for example) touching the displayed name of an existing file with the stylus or by writing the name of the file on the screen, all usual editing functions can be performed with stylus entry. When the user wishes to change a displayed character or symbol, he may simply write over the displayed character or symbol and as described hereinbelow the pattern recognition algorithm will translate the written entry into computer text. For example, the editing software allows text to be eliminated by simply drawing a line through it and a conventional caret symbol may be used to change the operating mode to the insert mode. In the insert mode, display screen 20 provides additional space for entry of handwritten characters or symbols which are inserted in the text after the Point where a caret was written in. Text can be moved simply by placing brackets or other user-defined delimiters around a displayed phrase or word and writing a caret or other user-defined symbol in the area of the text in which the user wishes this material to appear. New margins can be set by drawing vertical lines down the side of the displayed text where the new margins should appear.

The basic editor software also allows new documents to be created by simply writing Handwritten Symbols on the screen. All documents can be stored, changed and communicated in the manner in which these functions are accomplished on a conventional word processing system with the difference that these functions are accomplished with handwritten Editing Symbols on the (optional) screen or by touching the Softkeys with the stylus. The composite text thus produced and stored can be subsequently offloaded through the RS 232 port 62 (FIG. 4) to another computer, a similar device, an external data gathering device or recording device, into a printer or through a telecommunications system.

In addition to these major operating modes, a number of ancillary elements and features add to the utility of the present invention. A conventional alphanumeric keyboard (not shown) containing a full set of keys can be connected to a conventional keyboard interface (not shown) to support the entry of alphanumeric characters. An AC/DC power connector may also be used in those applications when portability is not needed and when needed to meet the power requirements of screen technologies such as gas plasma displays and electroluminescent displays.

In actual use the keyboardless computer can function in any application or environment in which handwritten input translated into computer text is useful or necessary. Illustratively, the device can function as a new generation word processor, or for use in fields such as sales, nursing, inventory control, census taking, claims adjusting, to name just a few of the many uses of the invention, or as a general learning and testing device in education. Since the pattern recognition software can learn and translate into computer text from languages which are not made up of a small or limited set of alphanumeric characters (e.g., Japanese, Korean, and Chinese), it has particular utility for word processing and telecommunications in these languages.

In the practice of this invention, it is particularly desirable to use a single computer screen to display any initial forms, Font Symbols or other displays to be edited, and to create a nearby "window" of blank space where Handwritten Symbols are to be written, displayed and identified, and where the Font Symbols corresponding to the Handwritten Symbols are to be displayed. In this way, the user can view the text being edited and the proposed insert or change without significant movement (if any) of the head and eyes. This is illustrated in FIGS. 11A to 11D. This feature of the invention (proximity on one screen of text to be edited and the window into which new text is to be handwritten) is very important to the simple, rapid, comfortable use of the invention. In a preferred embodiment of this invention, the system "learns" the handwriting of a particular user prior to actual use. For example, if using the Roman alphabet, the twenty-six letters of the alphabet and the numerals from 0 to 9 would be inserted into the database. Punctuation symbols, such as periods, commas, question marks, colons, semi-colons, hyphens and the like could also be inserted. There is virtually no limit to the Handwritten Symbols which can be recognized and stored in the database. Of course, the computer will have to store a suitable array of Font Symbols for conversion of the Handwritten Symbols. Different sets of Font Symbols could be created and stored in the permanent memory of the computer, as in ROM chip 54. For example, in English language usage, a chip could contain one (or more) fonts of numbers and letters, suitable punctuation symbols and appropriate mathematical symbols. Other chips could have stored Font Symbols for the Arabic, Cyrillic or Greek alphabets, Japanese, Chinese or Korean "Kanji", symbols for use by architects or engineers, or chemical symbols (e.g., benzene rings and the like).

Figure 10:
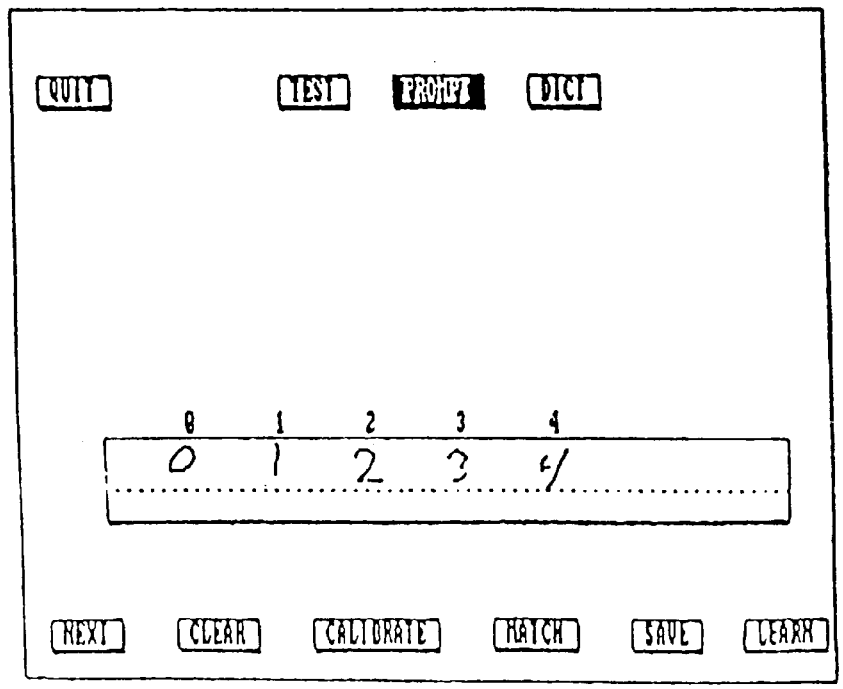
FIG. 10 is a top plan view of a screen illustrating the "initializing" of the database for Handwritten Symbols.

In FIG. 10, one of a series of learning screens is displayed and the user is prompted to write the numbers 0 through 4. The computer will attempt to match the written numbers with the existing database (if any). If it cannot be matched because there is no existing database or because there is a poor match with an existing database, the character is added to the database. This learning process continues until all of the alphanumeric (or other) characters and symbols to be used are entered into the database. The system has the capability of storing multiple Stroke characterization databases for systems used by more than one user. The existence of a unique Stroke characterization database for each user has the further advantage of making the writing angle irrelevant. As a result, the invention is adaptable to all handwriting styles and is usable by right-handed and left-handed persons. One feature may desirably be incorporated into the apparatus of the invention to accommodate left-handed and right-handed persons. This feature is a receptacle (not shown) for the stylus connector on either side of housing 12, so that the stylus 16 may be connected on the left side for left-handed persons and on the right side for right-handed persons.

FIG. 10 also provides an example of the use of "Softkeys". In addition to the input line, a variety of Softkeys appear. Each Softkey corresponds to a function that can be performed by the system. In order to execute the function, the user merely touches the indicated Point with the pen. The Softkey will then appear in reverse video and the selected function is performed. There are numerous advantages to Softkeys over traditional function keys. Some of the more significant of these are that the user is no longer required to memorize what function key performs what function; the need for keyboard overlays is eliminated: and different Softkeys can be made available (displayed and made operational) at different Points within a program.

FIGS. 11A to 11I demonstrates some of the simplifications in word processing made possible through the use of this invention. In FIG. 11A a standard screen of text is displayed. The user of the keyboardless entry system decides that additional information needs to be added and draws an insert symbol (e.g., caret) on the screen at the desired position. A data entry "window" then appears. (FIG. 11B). The text is written in as Handwritten Symbols (FIG. 11C), matched (converted to Font Symbols) (FIG. 11D), and then inserted (FIG. 11E). The operator reconsiders the addition and draws a horizontal line through the new material. (FIG. 11F). It is immediately erased. (FIG. 11G). Next, the operator decides that a larger right-hand margin would be more appropriate for the text. A vertical line is drawn on the screen (FIG. 11H) and the margin is automatically adjusted (FIG. 11I).

A generalized block diagram of the editing process is provided in FIG. 13 and a description of that figure appears hereinbelow.

Figures 12B, 12C:
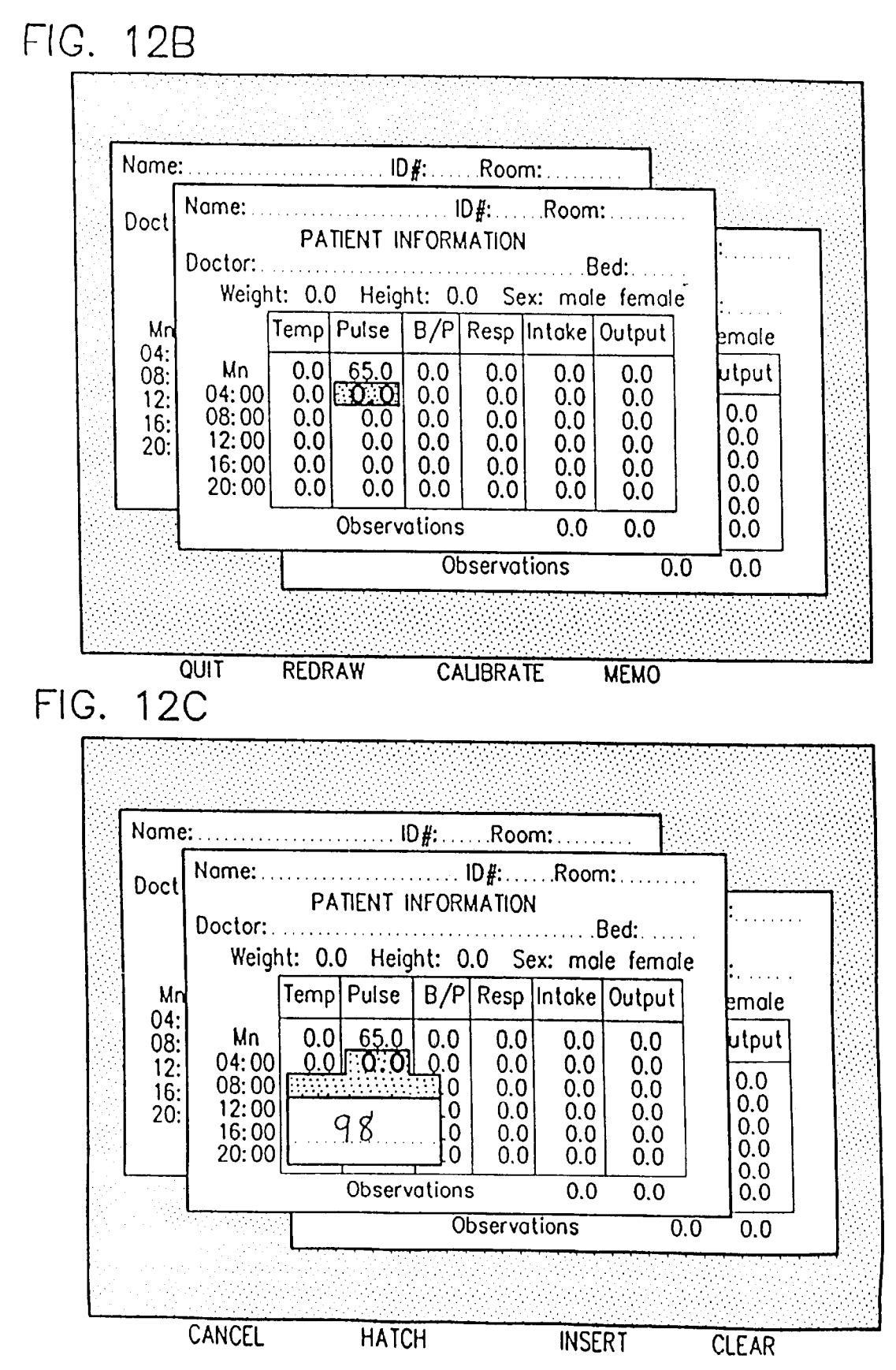
Figures 12F, 12G:
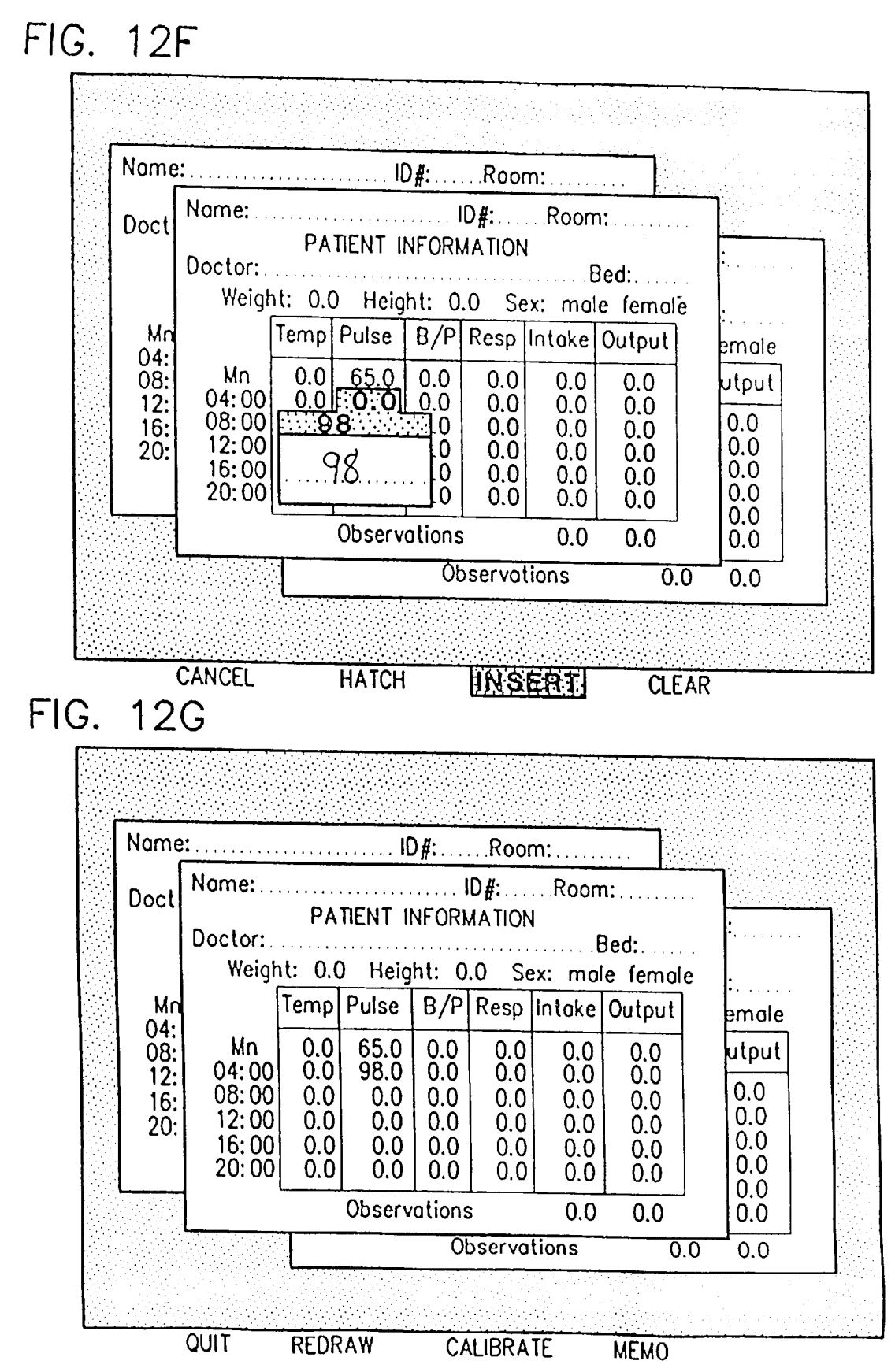

FIGS. 12A–12G illustrate how a blank form may be used for a hospital patient. The user of the system first calls up the proper blank form (FIG. 12A). This may be done, for example, by touching an appropriate Softkey. The area where the information, in this case a pulse observation, is to be inserted is touched with the pen (FIG. 12B). After the desired location is highlighted, a "window" appears directly below the space where the observation is to be recorded (FIG. 12C). The nurse then touches the pen on the match box which appears highlighted (FIG. 12D). The software then matches the handwritten input to the corresponding Font Symbols and displays the result (FIG. 12E). If there is an accurate match, the "insert" block is touched (FIG. 12F), and the new observation is added to the patient's records (FIG. 12G). This mechanism is clearly applicable to a wide variety of "blank forms" in which data is inserted into a form or corrected. For example, it could be used to correct or update financial information in a spreadsheet program. All such applications are within the purview of this invention. Other information can be recorded in the same manner.

The reason for using a black background and white letters for the newly entered Font Symbols is to facilitate checking the accuracy of the inputted character. Although this is preferable, it is not essential and a white background and black letters is also acceptable.

The ability to create a window and input data on the same screen and in physical proximity to the text being edited or space for data to be input is an important feature of this invention, for it permits ease and speed in the use of the invention. The user's eye may focus on the space where the data will be inserted and the ability to contemporaneously display Handwritten Symbols and the corresponding Font Symbols makes it easy to see errors, when the system "misreads" a Handwritten Symbol, and then correct errors quickly and easily.

Figure 5:
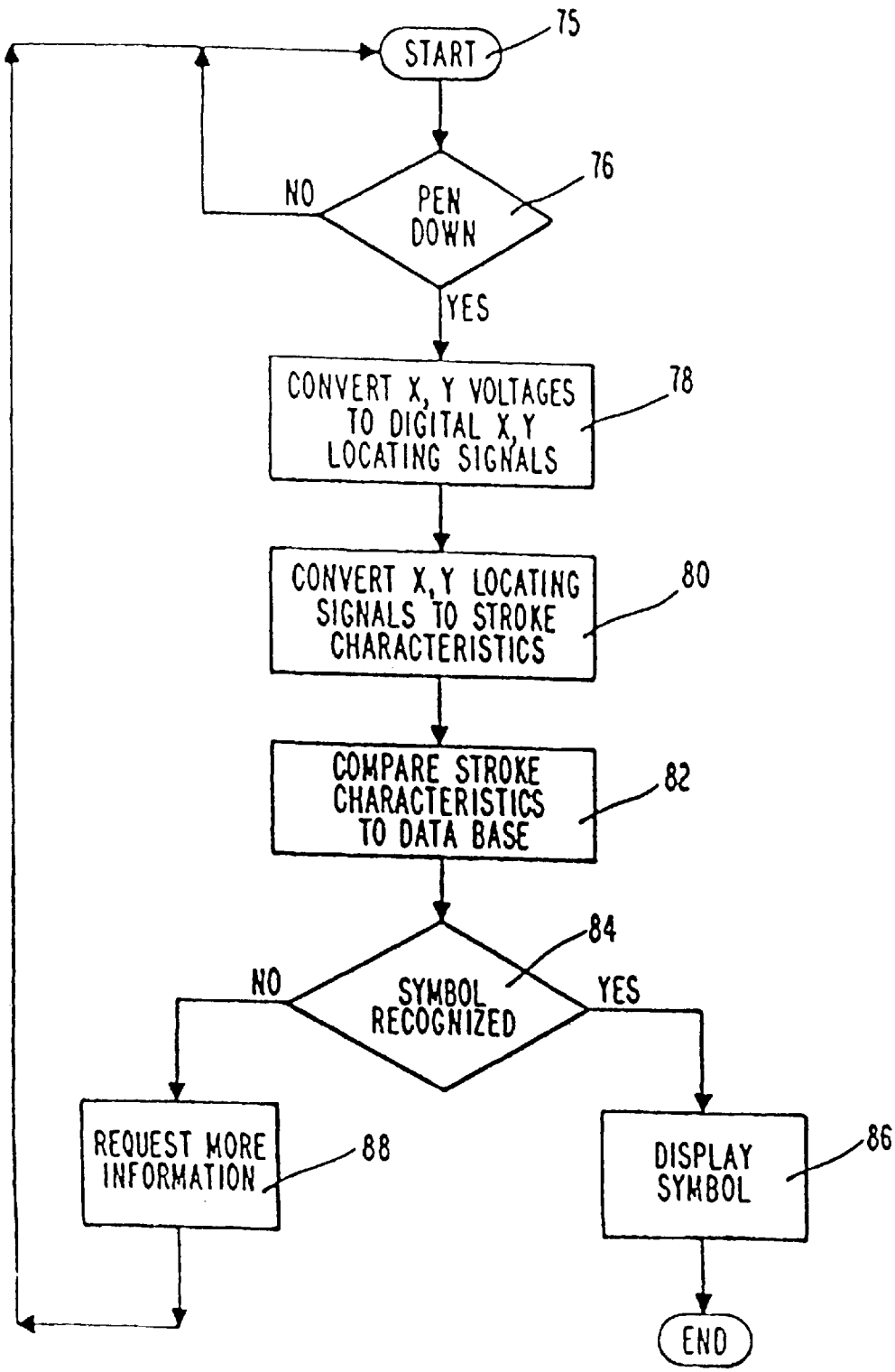
FIG. 5 is a schematic block diagram depicting the movement of data within the system when modified by handwritten characters and commands.

Referring first to FIG. 5, the overall operation and functioning of the pattern recognition software will now be described. When the operating system calls the pattern recognition program, the program begins in terminal 75 where a number of variables and counters are initialized. The software then proceeds to decision diamond 76 where the program determines if stylus 16 (FIG. 2) is in contact with input screen 18 (FIG. 2A). The system provides a "pen down" signal, as shown in processing box 78, as well as the X,Y coordinate voltages as locating signals, as described above. Microcomputer 14 (FIG. 4), using the software according to the present invention, converts the X,Y coordinate locating signals into Stroke characteristics using programs stored in ROM 54 (FIG. 4), or a separate microcomputer can do the conversion, such as microcontroller 44. If a pen down signal is received, the software proceeds to processing box 80 where the individual locating signals are combined into "Strokes," a Stroke being defined as the Point locating signals produced between a "pen down" signal and a "pen up" signal.

The system then calculates a transform, as described below, for each Point, transforming the Point coordinates from the X,Y Cartesian coordinate system to a relational coordinate system. The software next proceeds to processing box 82, where it compares the Stroke with previously entered Strokes accumulated into a database, and determines if the Stroke is represented by a symbol in the database. If a match is found (if the Font Symbol represented by the Strokes is recognized), as indicated in decision diamond 84, microprocessor 50 (FIG. 4) causes the symbol to be sent to display screen 20 (FIG. 4) as indicated in processing box 86. If a match is not found, microprocessor 50 (FIG. 4) causes a message to be displayed, as indicated in processing box 88, which requests further input from stylus on input screen 18 (FIG. 4) by either flashing an entry which is close to a match or a non-recognition symbol.

As mentioned above, the software compares the Stroke characteristics of each Handwritten Symbol to data entries previously stored in a database. In a preferred embodiment, the database is arranged into sections of characters or symbols by the number of Strokes needed to make the character or symbol. Within each section, the entries are randomly arranged at first, but after use, as explained herein, the most frequently used entries "rise" to the top of the database. It should be noted that each user will have his or her own particular style of writing a Handwritten Symbol and that each Handwritten Symbol may have a number of different variations.

For example, many people write the lower case letter "h" using a single Stroke. They do this by starting the pen on the writing tablet at a Point where they wish to place the top of the letter, drawing a vertical line downwardly to the base line, then without removing the pen from the paper, proceeding back up to the midpoint of the previously drawn vertical line, over to the right and down to the base line when the pen is picked up from the paper. On the other hand, these same people may draw the upper case letter "H" using two Strokes. They do this by drawing the left hand vertical line and horizontal line as is done for the lower case "h", picking the pen up from the tablet, and then drawing the right hand vertical line. Appendix I displays the data of the Stroke data Points for these two letters as the data is stored in memory after having been generated by an embodiment of the present invention.

As shown in Appendix I, the letter "h" as drawn at one particular time by one user has one Stroke (ns=1) with 20 Points (np=20) and x and y coordinate characteristics for the minimum, mean and maximum normalized values (1/80th of a line width) as follows: −17 and −6; 0 and 18; and 19 and 60, respectively. The values in the first vertical column are the Point-to-Point slopes, normalized to 360°/256°. The values in the second vertical column are the Point-to-Point average vertical positions above the base line, normalized to 1/80 of the line width. A typical line width is about 0.4 inches.

Figure 6:
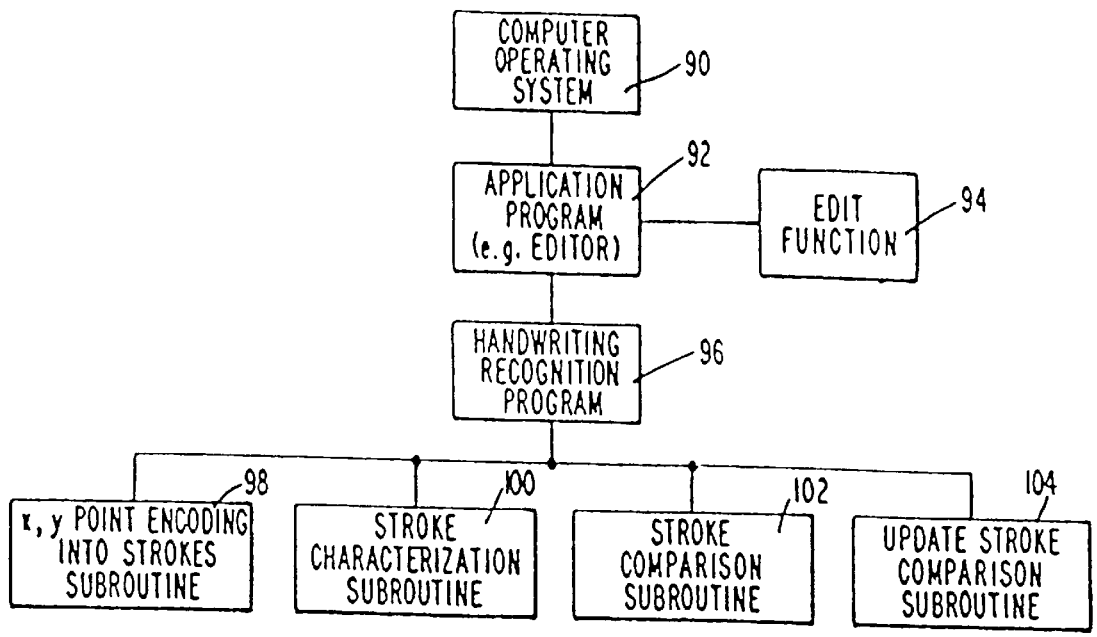
FIG. 6 is an overall system block diagram depicting the hierarchy of software used to operate the system.

Referring now to FIG. 6, a software hierarchy of programs is depicted. At the top, overseeing the entire operation of computer system 10 (FIG. 1), is an operating system as indicated by box 90. Applications programs shown in boxes 92 and 94, residing in RAM 56 (FIG. 4) and ROM 54 (FIG. 4) can be executed by microprocessor 50 (FIG. 4) under control of the operating systems. When a Handwritten Character is required or is indicated by an interrupt, handwriting recognition software 96 is called. A first subroutine, indicated in box 98, encodes the X,Y coordinates into Strokes. The characteristics of the Strokes are then defined by a subroutine 100 followed by comparisons of the Strokes with a database that has been loaded from ROM 54 (FIG. 4) into RAM 56 (FIG. 4). The comparison is made by a subroutine 102. When the operating system is in the "learning"mode, the database is updated with the new Stroke data and symbols, as indicated in box 104. Similarly, a previously stored document can be edited by applications program 92 by using edit function 94 as called by the operator, who provides the instructions as input using the subroutines 98, 100 and 102 of handwriting recognition program 92.

Figure 7:
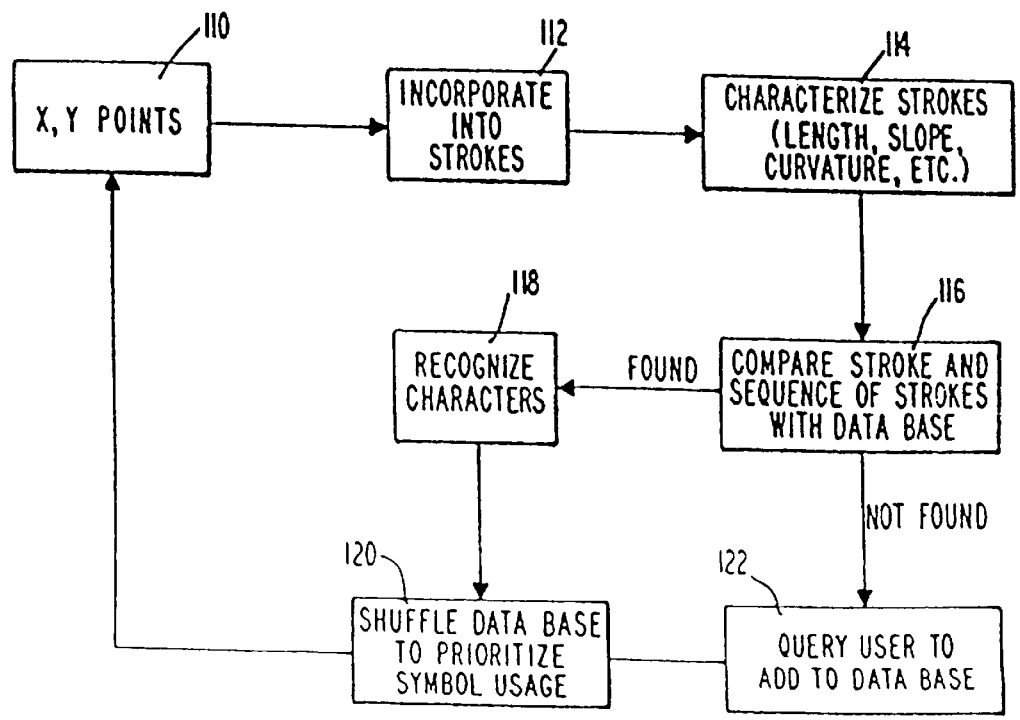
FIG. 7 is a generalized block diagram of the character and pattern recognition algorithm.

Referring now also to FIG. 7, operating system 90 (FIG. 6) executes the Handwritten Character recognition software 96 (FIG. 6) by accepting as input the X,Y coordinate Points, depicted in box 110, of the position of stylus 16 (FIG. 2) on input screen 18 (FIG. 2) and encodes these Points into Strokes as depicted in box 112. The program then characterizes the Strokes by some description set, such as considering the length, curvature, slope, and position of the Stroke, as depicted in box 114. In box 116 the best comparison is then found of the characterized Stroke or sequence of Strokes with those in the database. If a sufficiently close match is found, the character is identified in box 118 and the database entry is swapped with the entry above it as shown in box 120. In this way, the most frequently identified characters will "rise" to the top of the database and the overall system performance, as measured in time to find a match, will be increased. If a match is not found, the user can add to the bottom of the database, as indicated in box 122.

Figure 8B:
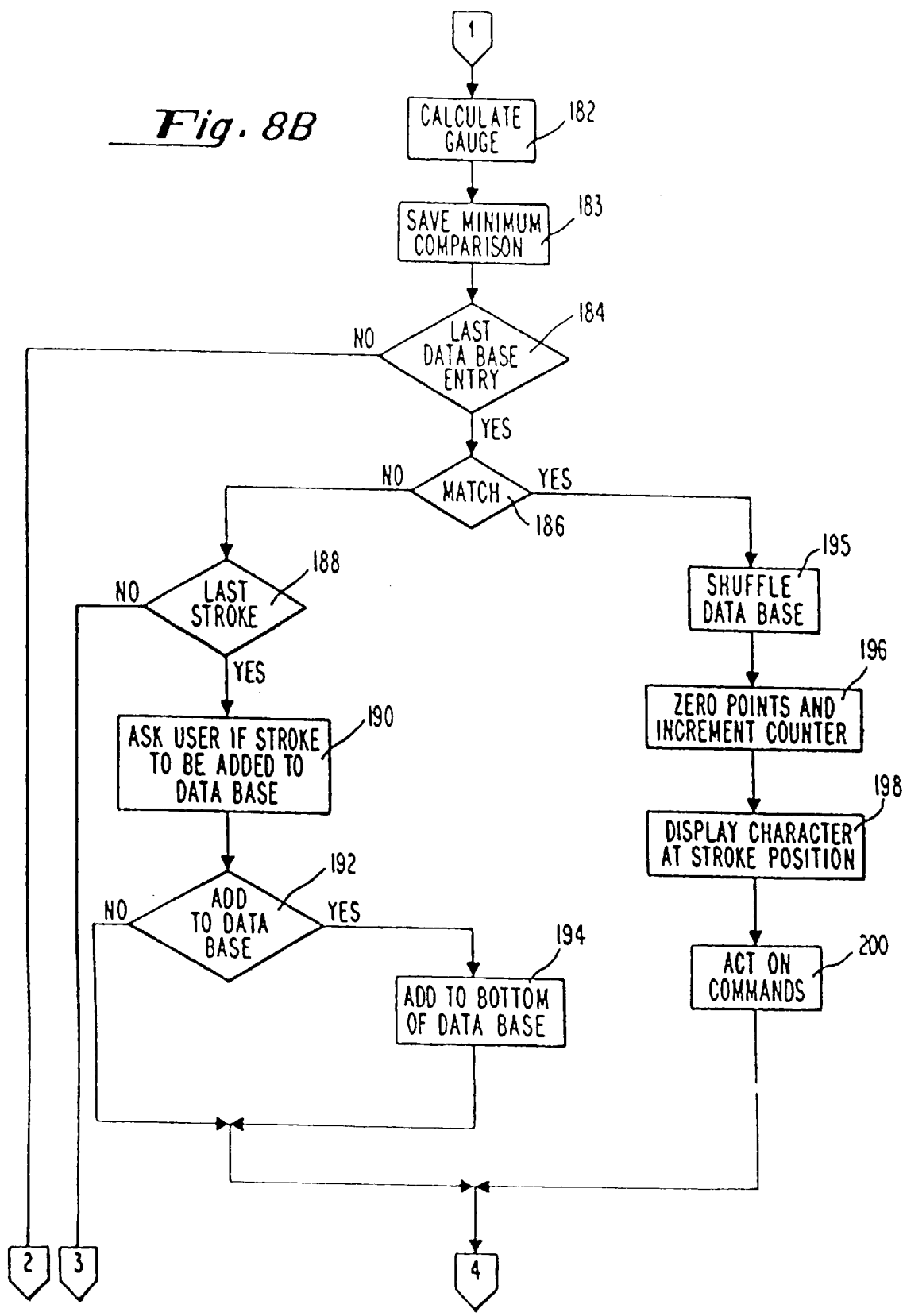
Figure 9:
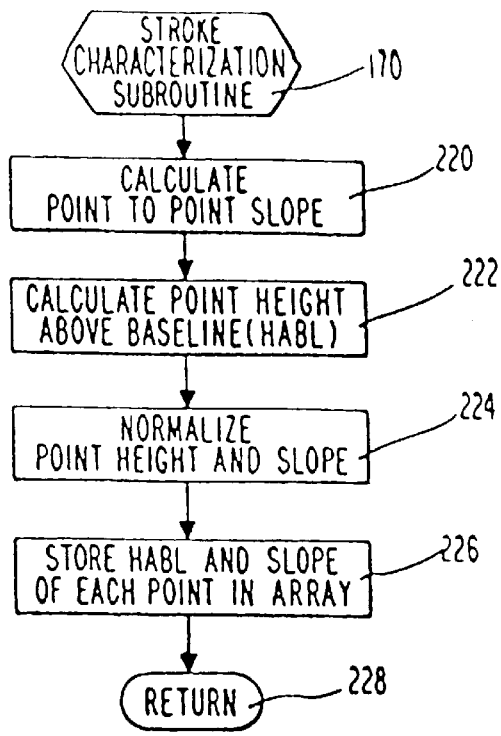
FIG. 9 is a schematic block diagram of the Stroke characterization subroutine.

With reference now to FIGS. 8 and 9, a flowchart of the computer program to recognize a particular Stroke sequence is set forth. The computer program begins in terminal 150 and proceeds to process the X,Y voltages from processing box 152, the voltages having been converted to a digital signal. The program then proceeds to decision box 154 where the program determines whether the pen or stylus 16 (FIG. 2) is out of contact with input screen 18. This determination is made by both the X voltage and the Y voltage being zero. If the program determines that the pen is up, then the Stroke is determined as having been completed and the program branches to decision box 156. In decision box 156, the program determines whether there are less than three Points in the Stroke and if so the program branches to decision box 158. In decision box 158, the program determines whether there are zero Points in the Stroke. If there are zero Points in the Stroke, then the program loops back to the beginning of processing box 152 where another set of Points is read. If the Point counter (incremented in processing box 164) indicates that there are more than zero Points, the program branches to processing box 172. In processing box 172 the Stroke is identified as a dot and its height above the base line (HABL) is calculated in processing box 173. From processing box 173 the program proceeds to processing box 171.

However, if the pen down signal is received, the program branches to processing box 160 where the voltages are scaled to determine the coordinate Point using the following formulas:

$$X = a_1 v_1 + b_1$$

$$Y = a_2 v_2 + b_2$$

The constants $a_1$ and $b_1$ are scaling parameters that are determined from calibrating the input surface of the particular display.

Once the voltages are scaled, the program proceeds to decision diamond 162 where the program determines whether it is an erroneous Point. This is done by comparing the distance between Points and eliminating a Point if the distance is to great (greater than 0.10 inches is presently used.) On the other hand, a Point is also eliminated if the Points are too close together. Points are presently thinned out if they are within 0.015 inches. The comparison problem that exists for the first Point is resolved by determining if a Point is the first Point after a pen is down and then that Point is used only to check the next Point which is accepted, assuming that that Point is within the maximum distance (0.10 inches).

If the distance between Points is determined as being outside the two criteria, the program drops the Point and branches back to the top of processing box 152 to read another pair of coordinate Point voltages.

On the other hand, if the Points fall within the criteria, the program continues to processing box 164 where a Point counter is incremented to keep track of the number of Points. This number is used in decision diamond 156, as mentioned hereinabove. The program then continues to processing box 166 where the Points are smoothed according to any one of a number of formulas. Smoothing is used to minimize noise from digitization, from erratic hand motion and from electronic noise. The simplest smoothing technique is a multiple Point average which results in calculating new Points ($x_j'$ $y_j'$) as follows:

$$x_j' = \sum_{i=n_1}^{n_2} x_i/(n_2 - n_1 + 1)$$

And similarly for $y_j'$ smoothed over Points $n_1-n_2$.

Another simple method is called the running weighted average method and utilizes the following formula:

$$X_j' = \alpha x_j + (1-\alpha)x_j' - 1$$

Alpha is a weighting constant that is usually positive (and less than one) and has been used at 0.25. The summations have been taken with $n_2$ minus $n_1$ equal to one. A third method involves what is called a spline fit wherein the following formula is used:

$$x_j' = (x_{j-1} + 4x_j + x_{j+1})$$

Any of the foregoing methods can be applied either before or after filtering. The filtering is done so as to reduce the number of input Points and to space data so that difference and/or angle calculations can be made within acceptable random error bounds. A simple process of thinning a sequence of Points by excluding the acceptance of subsequent Points within a set distance of the previously accepted Points has been found to be an effective filter.

From processing box 166, the program proceeds to processing box 168 where the Point is stored in an array that is incremented for each new Point since the last pen down signal. Thus, an addressable array of Points is created for each sequence of Points obtained from a pen down to a pen up signal. This sequence of Points is called a Stroke. From processing box 168, the program loops back to the top of processing box 152 where another Point is obtained until a pen up signal ends the Stroke.

In decision diamond 156, a determination was made as to whether there were less than three Points in a Stroke. By definition, if there are three or more Points in a Stroke, the Stroke is a line and not a dot. If there are three or more Points in the Stroke, the program branches to subroutine box 170. In subroutine box 170, discussed in greater detail hereinbelow with respect to FIG. 9, the Stroke is characterized as to its slope and base line height.

As can be seen from the foregoing, the segmentation of the stream of coordinate Points into a Stroke is based primarily on the determining when stylus 16 is "up" or not in contact with the surface of input screen 18. Alternatively, a stream of Points can be segmented to form Strokes on the basis of other considerations. For example they can be segmented based upon changes in a locally calculated curvature or upon a large local curvature. Local curvature is calculated by the change in distance along the input coordinates divided into the change in slope. This produces radius of curvature. When the radius of curvature changes rapidly with respect to distance along the input coordinates, or if the radius is too small, then a segmentation Stroke is assumed to end, and a new Stroke begun. Further segmentation techniques can look at the relative maximum and minimum in one or both coordinates and/or the curve crossings in the coordinates. However, these latter two methods have been determined to be less effective.

Characterizing a Stroke reduces the sequence of coordinates defining the Stroke or segment to a set of characteristics that are unique, generalized and minimal. Uniqueness refers to both factors that the same characteristics are generated by the same coordinates and that the characteristics are sufficient to regenerate an approximation to the original coordinate sequence. The term "generalized" is used to mean that the characterization is invariant under such transformations so that the symbols are invariant (e.g., translation and scaling or stretching or small tilt). The scaling of all distances is accomplished by taking a ratio of the distance to a writing entry line width.

The minimal set of segment characteristics have the following features:

(1) Stroke position: one or more of centroid/average, extent extreme or beginning and ending Points determined relative to the writing entry line, to previous Strokes, or to character extent or center;

(2) Stroke shape is characterized by one or more of average slope, change in slope (which is a measure of average curvature) and/or a change in curvature, by sequence of slopes over specific length segments or over fractional lengths, or by a gross description of linear direction or circular completion and opening direction;

(3) And Stroke length as characterized by distance along the curve and/or the extent extremum along the coordinate system.

In one embodiment of the present invention, positioning by centroid, extent extremum, and starting and ending coordinates have been successfully used. The Stroke shape is encoded as a sequence of slopes and vertical positions (relative to Stroke centroid). The Stroke length can be approximated by the number of filtered Points. Alternatively, the average curvature can be encoded in total slope change (along with length), change in starting to ending slope or fitting the slope angle versus length curve for rate of change of slope angle. Additional characteristics that could be used include location of coordinate relative extrema, curve crossing, cusps, and Stroke direction. A particular method used to determine the unique characteristics is set forth below.

1. The numerical values of the Criteria for each Stroke of the Handwritten Symbol are determined.

2. The database values for each stroke of the previously learned Handwritten Symbol is determined and subtracted from the newly determined values respectively.

3. The absolute values of each difference are scaled, to make each of the five measurements reasonably equivalent to the others such as lengths scaled to height between lines.

4. The five thus-determined values are added.

5. A predetermined threshold is used as "goodness" test of recognition - - - too high a value and Font Symbols are infrequently recognized and too low a value causes Font Symbols to be misidentified. Thresholds of approximately 1,000 are used initially and then switched to approximately 100 for improved recognition. If the threshold is exceeded, the comparison is discarded and an error message is created and displayed.

6. The database is searched to find a numerical minimum difference. If the minimum difference is below the acceptable threshold for recognition, the corresponding Font Symbol is displayed on the screen or the command is performed, as the case may be.

It has also been found that the preferred classification of a Stroke is a continuous one, rather than one that is grossly discrete. For example, determining a slope by angle in 256 directions rather than in 8 is desirable. Other non-continuous classifications can include bars/arches/hooks, number and closure of cusps or horizontal or vertical Strokes.

From subroutine 170, the program proceeds to processing box 171 where both an individual Stroke and one or more preceding Strokes are compared with a database entry that is stored in RAM 56 (FIG. 4).

This comparison initially begins with three eliminating questions that are asked by the program in decision diamonds 174, 176, and 178. In each case, if the database entry is eliminated, the program proceeds to a processing box 180 where the address of the next data entry is received and from which the program loops back to the top of processing box 171. In decision diamond 174, the first eliminator is asked by seeking if the number of Strokes are different. If the number of Strokes are the same, the program proceeds to decision diamond 176 where the average Height Above Base Line (HABL) is calculated and compared with the HABL of the data entry. The entry is eliminated if the difference in the average HABL's is greater than one-half the height of the entry line. From a negative determination in decision diamond 176, the program proceeds to decision diamond 178 where the number of Points per Stroke are compared and the database entry is eliminated if the difference in number of Points is greater than ten. This determination varies from that made in decision diamond 174 because it is concerned only with the number of Points for each Stroke. However, in decision diamond 174, certain letters, such as the capital letters "E" and "A", have more than one Stroke per letter.

If a data entry is not eliminated by decision diamond 178, then the program proceeds to processing box 182 where the program calculates a gauge to be used to determine the closeness of the match between the selected entry in the database and the drawn Stroke. A presently preferred gauge is the sum of the absolute values of the differences between the Stroke values and the database entry values of:

a) distances or lengths n units of 1/80th of the line height (e.g., space 26, FIG. 2); and
 b) the slopes in units of $1/256^{th}$ of 360° over all the Points along the diagonal of the comparison matrix.

Alternatively, Dynamic Programming Techniques can be used to optimize the comparison using off-diagonal elements as well.

From processing box 182, the program proceeds to decision diamond 186 where a match is determined. In actuality, a match is determined by (the application of an arbitrary) gauge (maximum allowable variance), which is the sum of absolute values of the differences between the entered Stroke characterization and that of the stored database entry. In processing box 183, the lower of the present gauge and the previous lower gauge is saved as the best match. The program then goes to decision diamond 184 where a determination is made whether the present entry is the last database entry. If it is not, the program branches to processing box 180 where the next entry is selected. If it is the last entry, the program proceeds to decision diamond 185 where a determination of a match is made on the basis of the gauge being below a predetermined threshold. This threshold is set by the user based on experience with the system.

If no match is obtained, the program branches to decision diamond 188 where a determination is made whether all Strokes have been checked. If the last Stroke has been checked, then the present Stroke is compared in sequence with a previous Stroke to all two Stroke entries. As in the comparison with all one Stroke dictionary entries, the best fit comparison for all entered Strokes is the recognized symbol or sequence of symbols.

However, if the last Stroke has been read and there still is not a match, then the program proceeds to processing box 190 where a question is displayed on display screen 20 asking the user if a new Font Symbol should be added to the database. The user responds and that response is used in decision diamond 192. Either the Stroke sequence is added to the database in processing box 194 and the program branches back to the top of processing box 152, or the program branches immediately to the top of processing box 152.

On the other hand, if a match is determined in decision diamond 186, the program branches to processing box 195 where the program shuffles the database by interchanging the serial location of the matched entry with the entry above it. The program then proceeds to processing box 196 where the program zeros the Point counter and the increment counter. The program next proceeds to processing box 198 where the matched and characterized Stroke or Strokes are displayed by the computer as the identified Font Symbol. This display is located at the position in which the entry was made on input screen 18 (FIG. 2).

From processing box 198, the program proceeds to processing box 200 where the program can act on any commands which it has interpreted. An alternative characterization of the Stroke uses the Points themselves rather than the length, scope, curvature and position.

With reference now to FIG. 9, this Stroke characterization is depicted in greater detail. Stroke characterization subroutine 170 essentially performs a mathematical transformation of each Point on a Point-by-Point basis to transform the Points from an X,Y Cartesian coordinate system to one in which the coordinates are the normalized slope of each Point and the normalized height of each Point above the base line (HABL).

Subroutine 170 first calculates the Point to Point slope in processing box 220 and then calculates the height of each Point above the base line in processing box 222. The slope and HABL of each Point are then normalized respectively to 1/256th of 2 Pi and to 1/80th of the width of the entry line in processing box 224. From processing box 224, the system proceeds to processing box 226 where the calculated normalized values for each Point are stored in an addressable array. The subroutine then returns to the program through terminal 228.

When the comparison is made between each Stroke and the stored values, the comparison is made by the normalized Point slope and Point height above base line. As mentioned above, a match is determined by an arbitrary gauge which is the sum of absolute values of the differences between the written Stroke and the stored or dictionary Stroke. The system learns by adding new Strokes to the dictionary database. Once the database fills up, those Font Symbols that are infrequently used are replaced by new entries.

In a working embodiment of the present invention, the algorithm successfully identified upper and lower case letters and numbers when written discretely from one another. For Handwritten Symbols that are written such that they are continuous, direct extrapolation would require searching a database sequentially for one, two, three, etc. Stroke symbols and looking for the best fit. Upon identification of a Stroke fit, a "new" letter is tentatively recognized, except that the next few Strokes are analyzed to check if they change the previous symbol for a better fit. For example, two Strokes that have been identified as "ones" would be combined and changed to the capital letter "H" once a cross bar was identified.

The system design demonstrated by FIGS. 7 to 9 could easily be coded by one with ordinary skill in the art of computer programming into almost any computer language. The source code listings for one application program utilizing the disclosed invention is included as Appendix II. The software in Appendix II is written in Microsoft Basic, a common computer language available for virtually all microcomputers and operating systems. The program is a complete text editing demonstration, which takes advantage of many of the key features of this invention and shows the improvements that can be made upon traditional word processing systems through the utilization of this invention.

Program lines 2600 to 4000 contain the character recognition subroutine which includes the software code necessary to get X and Y coordinates. This section of the program corresponds to FIG. 8.

Program lines 2600 to 2699 make up a subroutine designed to obtain the X and Y coordinates of a given Point. This code corresponds to boxes 152, 154, 160, 162, 164, 166 and 168 of FIG. 8.

Program lines 3000 to 3339 constitute a Point and Stroke analysis and characterization routine embodying boxes 156, 158, 170, 172 and 173 of FIG. 8.

Program lines 3700 to 3790 make up a subroutine designed to compare the analyzed Strokes to a Stroke database. These program lines embody boxes 171 to 184 of FIG. 8.

Program lines 3810 to 3980 make up a subroutine which is designed to learn a new character. This code embodies boxes 186, 188, 190, 192 and 194 of FIG. 8.

Program lines 3060 to 3273 make up a subroutine designed for Stroke characterization purposes. This section of the code corresponds to FIG. 9.

Program lines 3060 to 3095 are used to calculate Point-to-Point slopes and embody box 220.

Program lines 3058, 3241 and 3262 are used to calculate a height above baseline (HABL) and correspond to box 222 of FIG. 9.

Programs lines 3253, 3270–3273 are used to normalize the Point height and slope and correspond to box 224 of FIG. 9.

Program line 3253 is used to store the height above baseline and embodies box 226 of FIG. 9.

The foregoing program can be stored in the memory of a microcomputer of microprocessor with a requirement of approximately 25K of machine memory, so that it can be seen that the use of the program does not use up a lot of expensive memory and is relatively fast in executing the program's operation. If the program is written in a language other than Basic, requiring less memory, such as assembly language, the size of the program can be made smaller.

Boxes 195 to 200 of FIG. 8 appear in logical places throughout the code.

A dictionary of the variables of the relevant code section is included as Appendix III.

Figure 13:
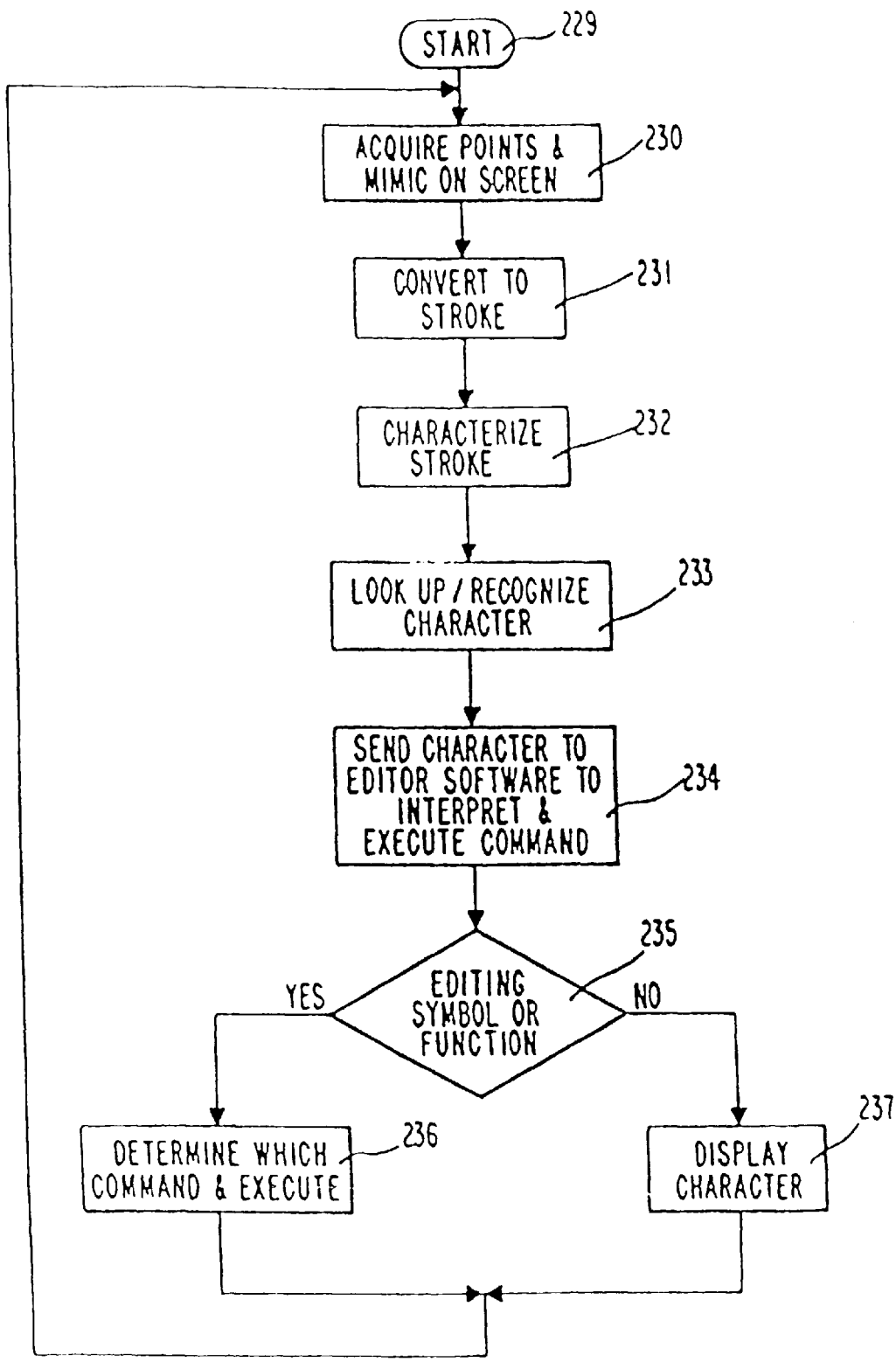
FIG. 13 is a generalized block diagram of the Linus Editor.

With reference now to FIG. 13, a flowchart for the editing software ("Editor") demonstrated by FIGS. 11A to 11I and described above is depicted. Once the Editor is loaded into the system (box 229), control of the screen is returned to the system. The system then proceeds in the normal manner described above to acquire Points and display them (box 230), convert the Points into Strokes (box 231), characterize each Stroke (box 232), and attempt to match the Stroke or Strokes with the database (box 233). In processing box 234, the system sends each Handwritten Symbol to the Editor to interpret and execute a command if necessary. At decision diamond 235, the Editor determines whether the Handwritten Symbol is an Editing Symbol or a Font Symbol. If the character is determined to be an Editing Symbol, the Editor proceeds to processing box 236 where it determines which Editing Symbol has been entered and executes the Editing Function. If the character is determined not to be an Editing Symbol, then the alphanumeric character corresponding to the handwritten entry is displayed at processing box 237. In an alternate configuration of the Editor, Font Symbols will only be accepted when the Editor is in the "Insert Mode." This structure insures that each Font Symbol is verified before being added to a document.

The Editor uses a variety of symbols designed to make editing on the system similar to, but much more efficient than, traditional editing with pencil and paper. These functions include, but are not limited to:

DELETE symbol—"" A horizontal line drawn through a character or characters. The Editor will remove the underlying characters and reformat the text.

ADJUST MARGINS symbol—"|" A vertical line longer then the height of one line on the display. The Editor will adjust the margin to the indicated position and reformat the text.

INSERT symbol—"^" A caret drawn at the Point where text is to be added. The Editor displays an input writing line (FIG. 11B) and when input is recognized inserts it into the text.

MARK TEXT symbols—"<" and ">" A less than and greater than symbol drawn at the beginning and end of a block of text. The marked text is displayed in reverse video and then special block functions can be performed.

DELETE MARKED TEXT—A delete symbol drawn within marked text will erase the marked text and reformat.

MOVE MARKED TEXT—An insert symbol drawn anywhere within the text moves the marked text to the indicated position, deletes it from its original position and reformats the text.

REPLACE MARKED TEXT—An insert symbol drawn within the marked text displays an input line and replaces the marked text with the inputted text.

The Editing Symbols described above can be changed to the particular Editing Symbols preferred by each user, thereby customizing the Editor and preventing new users from having to learn unfamiliar Editing Symbols.

Further modifications and enhancements to the present invention would be obvious to those skilled in the art. For example, the common characteristics of each Font Symbol could be extracted and organized into a synthetic symbol. The synthetic symbol's characteristics could then be exaggerated to maximize their variance from all other synthetic symbols. This would create a very compact, optimal database. On the other hand, as an example, a database created by the described preferred embodiment of the invention usually results in two to three different characterizations for each symbol.

The invention has numerous useful applications, almost without limitation. The most obvious applications are text editing and filling out and modifying forms. Some of the many other applications that may not come to mind as readily are writing in languages utilizing large numbers of symbols like Japanese or Chinese; writing in Arabic and similar languages made up of a limited number of complex symbols; writing chemical equations, including those involving organic compounds; writing music (a "window" with five parallel lines can be provided for musical applications); writing symbols and codes for graphic manipulation of data, including the transfer of graphic data to a spreadsheet; in education, as where predetermined questions are presented on the screens and the answers written in long-hand; as in teaching mathematics, as when numbers are manually inserted in equations and the equation analyzed to determine the result using those numbers; in CAD/CAM applications involving symbols, geometric shapes and the like.

Although the invention has been described in terms of a selected preferred embodiment encompassing the apparatus and methods aspects of a keyboardless computer system, the invention should not be deemed limited thereto, since other embodiments and modifications will readily occur to one skilled in the art.

APPENDIX I

```
'h' (1) ns = 1 x = (-17..0..19) y = (-6..18..60)
      1) np = 20 x = (-17..0..19) y = (-6..18..60)
           5,        42
         -57,        34
         -85,        26
         -71,        19
         -76,        10
         -64,         3
```

```
                    -89,
                    -72,           -9
                    -85,          -17
                    -72,          -24
                     47,          -17
                     56,          -11
                     43,           -3
                     39,            3
                     11,            7
                     -9,            5
                    -57,           -3
                    -71,          -11
                    -71,          -18

'H' (1) ns = 2  x = (-27..0..37)  y = (-20..18..61)
     1) np = 14  x = (-27..-12..-2)  y = (-20..22..61)
                     -9,           37
                      4,           38
                    -39,           32
                    -48,           25
                    -58,           16
                    -71,            8
                    -72,            2
                    -64,           -4
                    -89,          -11
                    -72,          -17
                    -80,          -24
                    -89,          -30
                    -80,          -36
     2) np - 20  x = (-21..10..37)  y = (-15..16..59)
                     27,           43
                    -80,           37
                    -71,           29
                    -98,           23
                    -80,           16
                    -78,            8
                    -85,            1
                    -89,           -6
                    -80,          -12
                    -80,          -18
                    -64,          -25
                    -64,          -31
                     48,          -25
                     56,          -18
                     48,          -12
                     64,           -6
                     89,            1
                   -124,            0
                   -124,           -2
```

APPENDIX II

```
: REM Z SERIES COPYWRITE: LINUS TECHNOLOGIES INCORPORATED, RESTON, VA., 7/30/85
10 DEFINT A-Y  : REM all integers except z
20 DIM X(2000),Y(2000),D(9, 800),DN(300),DC(300),SX( 80),SY( 80),SL( 80),SC( 80)
  ,SA( 80),SXX( 80),SXN( 80),SYX( 80),SYN( 80),SNO(80),MTITL$(20),A$(1500),LL(24),
 AS$(200),SLET(80),DBC(9,10),ASTRT(80),AEND(80)
```

```
25 PRINT FRE(0)
30 PRINT "Z SERIES COPYWRITE: LINUS TECHNOLOGIES INCORPORATED, RESTON, VA., 7/30
/85"
40  IMARGN=5   : IMARGX=62 : JTOP=1 : JBTM=15 : JMENU=160   :CR$=" "
50  KYBD=0: LHT=16 :SXTT=4: JTX=0: ACPT=1000
60 LHT4=LHT\4 :LHT3=LHT\3 :LHT5=LHT\5 :LHT2=LHT\2
70 PRINT "PLEASE INPUT PEN SWITCH...-1 TO RERUN, 0 TO RUN, 1 TO RUN & STORE": IN
PUT SWTPN
75  IF SWTPN > -1 THEN GOSUB 10700 :REM TOUCH TECH SCREEN IN ASCII @ 9600
80 PRINT "PLEASE INPUT DEBUG ...-5 TO 5 ": INPUT DBUG
85 PRINT "PLEASE INPUT ACCEPTANCE CRITERIA...10 TO 1000 ": INPUT ACPT
90 PRINT "PLEASE INPUT EDIT/LEARN SWITCH...1 TO EDIT": INPUT EDLN
92 PRINT "PLEASE INPUT KEYBOARD SWITCH...0 FOR KEYS, 1 FOR MENU ": INPUT KYBD
95 PRINT "PLEASE INPUT RESTART SWITCH...1 TO RESTART WITH STORED DATA BASE": INP
UT RESTRT
97 IFAVE=0 :IF SWTPN=-1 THEN IFAVE=0 :REM PRINT "PLEASE INPUT AVERAGING SWITCH..
.1 TO READ & AVERAGE, 2 TO AVERAGE INPUT": INPUT IFAVE
100 KEY OFF :SCREEN 2 :CLS
120 IF RESTRT = 1 THEN GOSUB 12700
130 IF EDLN = 1 THEN GOSUB 12100 : REM READ IN TEXT
140 IF EDLN = 1 THEN GOSUB 600 : REM PRINT TEXT
150 IF SWTPN = 1 THEN GOSUB 7200
151 IF SWTPN = -1 THEN GOSUB 7000
170 IF EDLN <> 1 THEN GOSUB 6100
180 IF EDLN <> 1 THEN GOSUB 12500
200 REM EDIT
205 LINY=0
210 IF SWTPN = -1 THEN GOSUB 7100 ELSE GOSUB  2600 :REM TOUCH TECH SCREEN IN ASC
II  @ 9600
211 IF SWTPN =1 THEN GOSUB 7300
220 REM RECOGNIZE SYMBOLS
221 IF NP > 2000 THEN LOCATE 23,1: PRINT "TOO MANY POINTS" : STOP
222 IF NP < 4 THEN GOTO 200
230 GOSUB 3000 :GOSUB 3400 :REM -,<>^,|,^,\,/,P,E
240 ON NCHAR GOTO 1200,1300,1700,6200,6700,6500,6600,12500,6900,200 :REM DELETE,
MOVE,FORMAT,INSERT,WRITE OVER,REMOVE,PARAGRAPH,INSERT CHARACTER,END
250 GOTO 200
500 END
600 REM DISPLAY TEXT FROM SINGLE CHARACTER ARRAY
605 LOCATE 23,20: PRINT "       ",
610 I=II : J=JJ : REM INITIAL DISPLAY POINT FOR NC1
620 FOR K=NC1 TO NC
630 IF A$(K) <> CR$ THEN GOTO 660
640 LOCATE J,I : PRINT " " : I=I+1 : IF I < 81 GOTO 640
650 J=J+1 : I=IMARGN : LL(J)=K : GOTO 740
660 IF I< IMARGX THEN GOTO 670 ELSE IF A$(K)=" " GOTO 690
670 IF J> JBTM THEN LOCATE 21,20: PRINT "READY", :RETURN
680 LOCATE J,I : IF I=IN THEN GOTO 710 ELSE PRINT A$(K) : I=I+1 : GOTO 740
690 LOCATE J,I : PRINT " " : I=I+1: IF I< 81 GOTO 690
700 J=J+1 : I=IMARGN : LL(J)=K+1 : GOTO 740
710 IF A$(K) <> " " THEN GOTO 730
720 IF LL(J)=K GOTO 740
730 I=I+1 : PRINT A$(K)
740 IF I> IMARGX+10 THEN GOTO 690 ELSE NEXT K
750 IF J> JTX THEN GOTO 790
760 JS=J
765 LOCATE J,I : PRINT " ": I=I+1: IF I< 81 GOTO 765
770 J=J+1 : I=IMARGN: IF J > JTX THEN GOTO 780 ELSE GOTO 765
780 J=JS
790 JTX=J : LOCATE 23,20: PRINT "READY", :RETURN
1200 REM DELETE
1205 XX=SXX(1): XN=SXN(1): YX=SYX(1): YN=SYN(1)
1206 IF NSTRK=1 GOTO 1220
1210 FOR L=2 TO NSTRK
1212 IF XX < SXX(L) THEN XX=SXX(L)
1214 IF XN > SXN(L) THEN XN=SXN(L)
1216 IF YX < SYX(L) THEN YX=SYX(L)
1218 IF YN > SYN(L) THEN YN=SYN(L)
1219 NEXT L
1220 IN=IMARGN
1225 I=INT(XX/8)+1 : IF I < IN THEN I=IN
1230 J=INT(YX/8)+1 : ML=LL(J) :M2=ML+I-IN : IF A$(ML)=" " THEN M2=M2+1
```

```
1231 IF A$(ML)=CR$ THEN M2=M2+1
1232 I=INT(XN/8)+1 : IF I < IN THEN I=IN
1234 J=INT(YN/8)+1 : ML=LL(J) :M1=ML+I-IN : IF A$(ML)=" " THEN M1=M1+1
1240 IF A$(ML)=CR$ THEN M1=M1+1
1250 MD=M2-M1+1: IF MD < 0 THEN MD=M1-M2+1 : M1=M2
1260 FOR M=M1 TO NC : A$(M)=A$(M+MD) : IF M+MD=NC THEN GOTO 1270 ELSE NEXT M
1270 FOR M=NC-MD+1 TO NC :A$(M)=" " : NEXT M
1280 II=I: JJ=J: NC1=M1 : GOSUB 600
1290 NC=NC-MD : GOTO 200
1300 REM MOVE INDICATED BY OPENING BRACKET
1305 IN=IMARGN
1310 XX=SXX(1): XN=SXN(1): YX=SYX(1): YN=SYN(1)
1320 XP=(XN+XX)/2: YP=(YN+YX)/2 :REM AVE BRACKET POSITION
1330 I=INT(XP/8)+1: J=INT(YP/8)+1:REM CONVERT X,Y TO I,J
1340 ML=LL(J): M1=ML+I-IN :REM CALC A ARRAY INDEX OF LETTER AT I,J
1350 IF A$(ML)=" " THEN M1=M1+1
1360 IF A$(ML)=CR$ THEN M1=M1+1
1390 XX=SXX(2): XN=SXN(2): YX=SYX(2): YN=SYN(2)
1400 XP=(XN+XX)/2: YP=(YN+YX)/2 :REM AVE BRACKET POSITION
1410 I=INT(XP/8)+1: J=INT(YP/8)+1:REM CONVERT X,Y TO I,J
1420 ML=LL(J): M2=ML+I-IN :REM CALC A ARRAY INDEX OF LETTER AT I,J
1430 IF A$(ML)=" " THEN M2=M2+1
1440 IF A$(ML)=CR$ THEN M2=M2+1
1450 M3=0 :REM INITIATE COUNTER
1460 FOR M=M1 TO M2 :REM LOOP OVER PORTION CUT
1470 M3=M3+1: REM INCREMENT COUNTER
1480 AS$(M3)=A$(M) :NEXT M :REM COPY CUT TEXT
1490 XX=SXX(3): XN=SXN(3): YX=SYX(3): YN=SYN(3)
1500 REM INSERT WITH M3 LETTERS STORED IN AS$ & xx,xn,yx,yn
1520 XP=(XN+XX)/2: YP=(YN+YX)/2 :REM AVE BRACKET POSITION
1530 I=INT(XP/8)+1: J=INT(YP/8)+1:REM CONVERT X,Y TO I,J
1540 ML=LL(J): M3=ML+I-IMARGN :REM CALC A ARRAY INDEX OF LETTER AT I,J
1550 IF A$(ML)=" " THEN M3=M3+1
1560 IF A$(ML)=CR$ THEN M3=M3+1
1570 MD=M2-M1+1 : IF MD > 0 THEN GOTO 1580 ELSE GOTO 200
1580 FOR M=M1 TO NC : REM LOOP OVER A$ ARRAY POSITIONS TO BE SHIFTED
1590 A$(M)=A$(M+MD) : REM SHIFT A$ ARRAY LETTERS
1600 IF M+MD = NC THEN GOTO 1610 ELSE NEXT M : REM STOP AT END OF ARRAY=NC
1610 IF M3 > M2 THEN M3=M3-MD :REM OFF SET INSERTION POINT TO ACCOUNT FOR DELETION
1620 FOR M=NC-MD TO M3 STEP -1 : REM SPRED ARRAY TO MAKE ROOM FOR INSERTION
1630 A$(M+MD)=A$(M) :REM MOVE LETTERS
1640 NEXT M
1650 FOR M=1 TO MD :REM LOOP OVER CHARACTERS
1660 A$(M3+M-1)=AS$(M) :REM INSERT LETTERS
1670 NEXT M
1680 CLS: II=IMARGN: JJ=JTOP: NC1=1 : GOSUB 600
1690 GOTO 200
1700 REM REFORMAT MARGINS
1720 XP=(SXN(L)+SXX(L))\2 :REM AVE BRACKET POSITION
1730 I=XP\8+1 :REM CONVERT X TO I
1740 IF ABS(I-IMARGN) <ABS(I-IMARGX) THEN IMARGN=I ELSE IMARGX=I
1750 CLS: II=IMARGN: JJ=JTOP: NC1=1 : GOSUB 600
1760 GOTO 200
2600 REM TT ACQUIRE POINTS IN ASCII  @ 9600  WITH TIME OUT
2603 M=20
2605 IF LOC(2) > 0 THEN IPUT$=INPUT$(1,2) : GOTO 2605
2606 PRINT #2,"G" :N=0
2610 IF LOC(2) < 40 THEN GOTO 2610
2620 NU=0: INPUT #2,XP,YP :INPUT #2,XPA,YPA :INPUT #2,XP0,YP0
2630 N=N+1: XPA=(XPA+XP0)\2: YPA=(YPA+YP0)\2: XP0=XPA: YP0=YPA: X(N)=XPA: Y(N)=YPA
2640 INPUT #2,XP,YP
2653 XPA=(XP+3*XPA)\4: YPA=(YP+3*YPA)\4
2657 IF ABS(XPA-XP0)+ABS(YPA-YP0) < 3 THEN GOTO 2672
2660 I=32*XPA\AX+BX:J=32*YPA\AY+BY:PSET(I,J)
2670 N=N+1 : X(N)=XPA :Y(N)=YPA: XP0=XPA: YP0=YPA
2672 IF LOC(2) > 9 THEN GOTO 2640
2675 MM=0
2680 MM=MM+1: IF LOC(2) > 9 THEN GOTO 2640 ELSE IF MM < M THEN GOTO 2680
2685 X(N)=-X(N): IF X(N) = 0 THEN X(N)=-1
2690 IF LOC(2) > 39 THEN GOTO 2620  ELSE NU=NU+1 :IF NU < 4000 THEN GOTO 2690
```

```
2695 PRINT #2,"S": NP=N
2696 IF DEBUG <> 0 THEN LOCATE 20,2 :PRINT "NP=",NP
2697 IF IFAVE=2 THEN GOSUB 4200
2698 IF DEBUG <> 0 THEN LOCATE 20,12 :PRINT NP
2699 RETURN
3000 REM CALCULATE CHARACTERIZATION OF STROKES
3005 REM GOSUB 4200 :REM 2 POINT AVERAGE POINTS
3010 A1=0: A2=0: DA1=0: DA2=0: SEND=0: ZX=0: ZY=0: ZA=0: ZDA=0: ZL=0: NSP=0
3015 NSTRK=0: XX=ABS(X(1)): XN=XX: YX=Y(1): YN=YX: M1=1: M2=1: M3=2: NLONG=0
3020 FOR M=2 TO NP
3025 IF X(M) < 0 THEN SEND=2  :X(M)=-X(M)
3030 IF M > M1 GOTO 3035 ELSE 3391
3035 IF X(M1) < 0 THEN M1=M: GOTO 3391
3040 DX=X(M)-X(M1): DY=Y(M)-Y(M1): ADX=ABS(DX): ADY=ABS(DY): DS=ADX+ADY
3043 IF AY > 0 THEN DY=-DY
3044 IF DS < 3 THEN GOTO 3391
3052 IF X(M) < XN THEN XN=X(M)
3053 IF X(M) > XX THEN XX=X(M)
3054 IF Y(M) < YN THEN YN=Y(M)
3056 IF Y(M) > YX THEN YX=Y(M)
3058 ZX=ZX+X(M)*DS: ZY=ZY+Y(M)*DS: ZL=ZL+DS: NSP=NSP+1
3060 IF ADX < ADY THEN GOTO 3080  :REM ENCODE ANGLE  0-255 +-n256
3070 IF DX > 0 THEN A1=64-(32*DY)\DX ELSE A1=192-(32*DY)\DX
3075 GOTO 3085
3080 IF DY > 0 THEN A1=    (32*DX)\DY ELSE A1=128+(32*DX)\DY
3085 IF NSP>M2 THEN GOTO 3090
3086 IF A1<0 THEN A1=A1+256
3087 ZA=ZA+A1*DS
3089 GOTO 3190
3090 IF A1-A2 < -127 THEN A1=A1+256 : GOTO 3090
3095 IF A1-A2 > 128 THEN A1=A1-256 : GOTO 3095
3100 ZA=ZA+A1*DS
3110 DA1=A1-A2
3115 ZDA=ZDA+DA1
3120 IF NSP > M3 THEN ADA=(DA2+ADA)/2 ELSE ADA=DA1 : ASTRT(NSTRK+1)=(A1+A2)\2
3130 IF NSP = M3+1 THEN ASTRT(NSTRK+1)=(A1+A2)\2
3140 IF ABS(DA1-ADA) > 80 THEN SEND=1
3150 IF ABS(DA1) > 64 THEN SEND=1
3190 IF SEND=0 THEN GOTO 3300
3200 REM END OF STROKE
3205 IF SEND = 1 THEN GOTO 3220
3206 X(M)=-X(M)
3208 SEND=0: SZL=ZL: SZL=32*SZL\AY: IF SZL < 0 THEN SZL=-SZL
3209 IF NSP < 3 THEN GOTO 3210 ELSE IF SZL > 2 THEN M1=M+1: GOTO 3250
3210 IF NSTRK > 0 THEN IF X(SNO(NSTRK)) > 0 THEN X(SNO(NSTRK))=-X(SNO(NSTRK))
3212 M1=M+1
3215 GOTO 3280
3220 SEND=0: SZL=ZL-DS: SZL=32*SZL\AY: IF SZL < 0 THEN SZL=-SZL
3226 IF NSP < 4 THEN GOTO 3300 ELSE IF SZL < LHT5 THEN GOTO 3300
3230 M1=M
3240 ZX=ZX-X(M)*DS
3241 ZY=ZY-Y(M)*DS
3242 ZL=ZL-DS: ZA=ZA-A1*DS: ZDA=ZDA-DA1
3243 NSP=NSP-1
3250 NSTRK=NSTRK+1
3253 SL(NSTRK)=50*SZL\LHT: AEND(NSTRK)=(A3+A4)\2: SC(NSTRK)=ZDA : AZA=ZA/ZL
3254 IF AZA > 255 THEN AZA=AZA-256 : GOTO 3254 :REM USE 128 HERE FOR DIRECTION I
NDEPENDENCE
3256 IF AZA <   0 THEN AZA=AZA+256 : GOTO 3256
3260 SX(NSTRK)=ZX/ZL: SX(NSTRK)=32*SX(NSTRK)\AX+BX
3262 SY(NSTRK)=ZY/ZL: SY(NSTRK)=32*SY(NSTRK)\AY+BY
3264 SA(NSTRK)=AZA
3270 SXX(NSTRK)=32*XX\AX+BX: SXN(NSTRK)=32*XN\AX+BX: SNO(NSTRK)=M
3272 IF AY < 0 THEN SYN(NSTRK)=32*YX\AY+BY: SYX(NSTRK)=32*YN\AY+BY : GOTO 3280
3273 SYX(NSTRK)=32*YX\AY+BY: SYN(NSTRK)=32*YN\AY+BY
3280 IF DBUG > 3 THEN LPRINT USING "######";M,NSP,X(M),Y(M),ZL,ZA,A1,DA1,ADA,ZDA
,(A1+A2+A3+A4)\4 ELSE IF DBUG < -3 THEN PRINT USING "######";M,NSP,X(M),Y(M),ZL,
ZA,A1,DA1,ADA,ZDA,(A1+A2+A3+A4)\4
3281 IF DBUG > 2 THEN LPRINT "SL,SA,SC,AS,AE",SL(NSTRK) SA(NSTRK) SC(NSTRK) ASTR
T(NSTRK) AEND(NSTRK) ELSE IF DBUG < -2 THEN PRINT "SL,SA,SC,AS,AE",SL(NSTRK) SA(
NSTRK) SC(NSTRK) ASTRT(NSTRK) AEND(NSTRK)
3285 A1=0: A2=0: DA1=0: DA2=0:DS2=0:DS1=0:SEND=0: ZX=0: ZY=0: ZA=0: ZDA=0: ZL=0
3290 XX=ABS(X(M1)): XN=XX :YX=Y(M1): YN=YX: NLONG=0 :NSP=0
```

```
3295 GOTO 3391
3300 REM FINISH LOOP
3310 M1=M
3320 DA3=DA2: DA2=DA1: DS2=DS1: DS1=DS: A4=A3: A3=A2: A2=A1
3390 IF DBUG > 3 THEN LPRINT USING "######";M,NSP,X(M),Y(M),ZL,ZA,A1,DA1,ADA,ZDA
,(A1+A2+A3+A4)\4 ELSE IF DBUG < -3 THEN PRINT USING "######";M,NSP,X(M),Y(M),ZL,
ZA,A1,DA1,ADA,ZDA,(A1+A2+A3+A4)\4
3391 NEXT M
3392 IF DBUG > 1 THEN LPRINT "     I  NO   X   Y    L    A    C   XX  XN   Y
X  YN  ST  ND"
3393 IF DBUG < -1 THEN LOCATE  9,1 :PRINT "     I  NO   X   Y    L    A    C
XX  XN  YX  YN  ST  ND"
3394 IF DBUG < -1 THEN LOCATE 10,1 :FOR I=1 TO NSTRK:PRINT USING "#####";I,SNO(I
),SX(I),SY(I),SL(I),SA(I),SC(I),SXX(I),SXN(I),SYX(I),SYN(I),ASTRT(I),AEND(I) :NE
XT I
3395 IF DBUG > 1 THEN FOR I=1 TO NSTRK: LPRINT USING "#####";I,SNO(I),SX(I),SY(
I),SL(I),SA(I),SC(I),SXX(I),SXN(I),SYX(I),SYN(I),ASTRT(I),AEND(I) :NEXT I
3396 IF NSTRK > 1 THEN GOSUB 4000 ELSE GOTO 3399
3397 IF DBUG < -1 THEN FOR I=1 TO NSTRK:PRINT USING "#####";I,SNO(I),SX(I),SY(I)
,SL(I),SA(I),SC(I),SXX(I),SXN(I),SYX(I),SYN(I),ASTRT(I),AEND(I) :NEXT I
3398 IF DBUG > 1 THEN FOR I=1 TO NSTRK: LPRINT USING "#####";I,SNO(I),SX(I),SY(
I),SL(I),SA(I),SC(I),SXX(I),SXN(I),SYX(I),SYN(I),ASTRT(I),AEND(I) :NEXT I
3399 RETURN
3400 REM EDITING SYMBOL RECOGNITION
3410 FOR L=1 TO NSTRK
3412 A1=(SA(L)+32)\64: IF A1 > 3 THEN A1=0
3416 IF A1 = 0 THEN IF SL(L) > 100 THEN NCHAR=3: RETURN: REM VERTICAL
3418 IF A1 = 1 THEN IF SL(L) >  60 THEN NCHAR=1: RETURN: REM HORIZONTAL
3420 IF A1 = 2 THEN IF SL(L) > 100 THEN NCHAR=3: RETURN: REM VERTICAL
3422 IF A1 = 3 THEN IF SL(L) >  60 THEN NCHAR=1: RETURN: REM HORIZONTAL
3430 NEXT L
3500 REM CONVERT LETTER TO EDITTING CODE
3510 ED=1 :GOSUB 3600 :ED =0
3515 IF NLET > 0 THEN GOTO 3530
3520 NCHAR=10: LOCATE 20,1: PRINT "TRY AGAIN" :RETURN
3530 IF CS$ = "-" THEN NCHAR =1 :RETURN
3532 IF NLET = 3 THEN IF CS$ = "^" THEN NCHAR=2 :RETURN
3536 IF CS$ = "^" THEN NCHAR=4 :RETURN
3538 IF CS$ = "\" THEN NCHAR=9 :RETURN
3540 IF CS$ = "P" THEN NCHAR=7 :RETURN
3542 IF CS$ = "E" THEN NCHAR=8 :RETURN
3544 IF CS$ = "/" THEN NCHAR=6 :RETURN
3546 IF NLET= 1    THEN NCHAR=5 :RETURN
3550 GOTO 3520
3590 RETURN
3600 REM PARCEL STROKES INTO CHARACTERS
3602 IF DBUG > 4 THEN LPRINT USING "######"; SXX(1),SXN(1),SYX(1),SYN(1),LHT4
3603 SLET(1)=1: NLET=1: IF NSTRK=1 THEN GOTO 3650
3605 FOR L=2 TO NSTRK
3606 IF DBUG > 4 THEN LPRINT USING "######"; SXX(L),SXN(L),SYX(L),SYN(L)
3607 ICONT=0
3610 FOR L1=1 TO 2 : IF L > 2 THEN GOTO 3615 ELSE IF L1=2 GOTO 3635
3615 IF SXX(L-L1) > SXX(L) THEN GOTO 3630 ELSE IF (SXX(L-L1)+LHT4) < SXN(L) THEN
 GOTO 3635
3620 IF ABS((SYX(L)+SYN(L))-(SYX(L-L1)+SYN(L-L1))) > LHT THEN GOTO 3635
3629 ICONT=L1 :GOTO 3635
3630 IF SXN(L-L1) > SXX(L)+LHT4 THEN GOTO 3635 ELSE GOTO 3620
3635 NEXT L1
3640 IF ICONT=0 THEN NLET=NLET+1 :SLET(L)=NLET: GOTO 3649
3645 NLET=SLET(L-ICONT) : SLET(L)=NLET :SLET(L-1)=NLET
3646 IF DBUG > 3 THEN LPRINT "L,NLET,SLET",L,NLET,SLET(L-1),SLET(L-2)
3649 NEXT L
3650 REM LOOP OVER LETTERS
3652 IF ED=1 THEN ZLINY=0: FOR LMN=1 TO NSTRK : ZLINY=ZLINY+SYX(LMN)+SYN(LMN): N
EXT LMN : LINY=ZLINY/NSTRK :LINY=(1+LINY\16)*8+4 :IF DBUG > 0 THEN LPRINT "LINY=
",LINY ELSE IF DBUG < 0 THEN LOCATE 22,1 :PRINT "LINY=",LINY
3655 MCHR=1: NST=0: XX=-1: XN=1000: XX1=-100 :YX=-1 :YN=1000 :YX1=-100
3656 FOR LSTRK=1 TO NSTRK+1
3657 LST=LSTRK :IF LSTRK = NSTRK+1 THEN GOTO 3659
3658 IF SLET(LSTRK) = MCHR THEN NST=NST+1: GOTO 3690
3659 IF NST > 10 THEN LOCATE 23,1 : PRINT "TOO MANY STROKES", :STOP
3660 FOR M=1 TO NST :LMN=LST-NST+M-1
```

```
3661 DBC(1,M)=SL(LMN): DBC(2,M)=SA(LMN): DBC(5,M)=SC(LMN)
3662 DBC(6,M)=(100*(SX(LMN)-SX(LST-NST)))\LHT :DBC(3,M)=ASTRT(LMN) :DBC(4,M)=AEN
D(LMN)
3663 DBC(7,M)=(100*(SY(LMN)-LINY))\LHT : DBC(9,M)=( 50*(32*Y(SNO(LMN)-1)\AY+BY-L
INY))\LHT: IF LMN =1 THEN DBC(8,M)=( 50*(32*Y(2)\AY+BY-LINY))\LHT ELSE DBC(8,M)=
( 50*(32*Y(SNO(LMN-1)+2)\AY+BY-LINY))\LHT
3664 IF YX < SYX(LMN) THEN YX=SYX(LMN)
3665 IF YN > SYN(LMN) THEN YN=SYN(LMN)
3666 IF XX < SXX(LMN) THEN XX=SXX(LMN)
3667 IF XN > SXN(LMN) THEN XN=SXN(LMN)
3668 IF DBUG > 0 THEN LPRINT USING "#####";MCHR,DBC(1,M),DBC(2,M),DBC(3,M),DBC(4
,M),DBC(5,M),DBC(6,M),DBC(7,M),DBC(8,M),DBC(9,M)
3669 IF DBUG < 0 THEN LOCATE 10+M,27: PRINT USING "#####";MCHR,DBC(1,M),DBC(2,M)
,DBC(3,M),DBC(4,M),DBC(5,M),DBC(6,M),DBC(7,M),DBC(8,M),DBC(9,M)
3670 NEXT M. :GOSUB 3700
3671 NPOS=(2+(XX+XN)\16-IMARGN)\2
3672 REM PRINT "MCHR,NPOS,CHAR,ED" ,MCHR,NPOS,CS$,ED :INPUT IJK
3673 IF ED = 1 THEN NPOS=0: AS$(MCHR)=CS$
3674 IF NPOS > 0 THEN IF NPOS < 40 THEN AS$(NPOS)=CS$
3675 REM
3676 IF ED <> 1 THEN LOCATE (LINY-LHT+1)\8,(XX+XN)\16+1 :PRINT CS$
3677 REM
3680 SXX(MCHR)=XX : SXN(MCHR)=XN
3682 SYX(MCHR)=YX : SYN(MCHR)=YN
3688 MCHR=MCHR+1: NST=1: XX1=XX: XX=-1: XN=1000: YX1=YX: YX=-1: YN=1000
3690 NEXT LSTRK
3699 RETURN
3700 REM COMPARE TO DATABASE
3710 R1=16000 :M3=0 :IF NDBT=0 THEN GOTO 3900
3715 FOR M=1 TO NDBT
3720 IF   DN(M) <> NST THEN GOTO 3790 :REM CHECK NUMBER OF STROKES
3725 M2E=9 :IF LINY = 0 THEN M2E=6
3730 R=0 : FOR M1 =1 TO NST
3735 FOR M2=1 TO M2E
3738 DR=ABS(D(M2,M3+M1)-DBC(M2,M1))
3740 IF M2 < 2 THEN GOTO 3744 ELSE IF M2 > 4 THEN GOTO 3744
3741 IF DR > 128 THEN DR=ABS(DR-256): GOTO 3741 :REM USE 64 FOR DIRECTION INDEPE
NDENCE
3742 IF ABS(D(5,M3+M1)) > 20 THEN DR=20*DR\(ABS(D(5,M3+M1)))
3744 IF DR > 300 GOTO 3790
3748 R=R+DR
3749 IF R > R1 GOTO 3790
3750 NEXT M2 : NEXT M1
3780 MS1=M : R1=R
3790 M3=M3+ DN(M) :NEXT M
3800 REM IDENTIFY CHARACTER
3803 CS$=CHR$( DC(MS1))
3804 REM
3805 IF DBUG <> 0 THEN LOCATE 19,1 :PRINT R1,MS1,CS$
3806 REM
3810 IF R1\NST > ACPT GOTO  3900 :REM CHARACTER NOT FOUND
3830 RETURN
3900 REM LEARN NEW CHARACTER
3902 IF LERN = 0 THEN CS$=CHR$(2): RETURN
3904 IF KYBD=0 THEN LOCATE 23,1 :INPUT "CHARACTER NOT UNDERSTOOD, PLEASE TYPE IT
 IN: ",CS$
3906 IF KYBD = 0 THEN LOCATE 23,1 :PRINT "
                                          "
3910 IF KYBD=1 THEN GOSUB 11400
3912 IF KYBD =1 THEN GOSUB 9600
3914 IF KYBD =1 THEN GOSUB 11600 : CS$=CHR$(MSEL)
3915 IF CS$="~" THEN GOTO 3960
3917 IF ED=1 THEN RETURN
3920 IF NDBT =  300 THEN PRINT "Too Many Symbols": STOP
3926 NDBT=NDBT+1 :  DN(NDBT)=NST :  DC(NDBT)=ASC(CS$)
3930 IF M3+NST > 800 THEN PRINT "Too Many Strokes" :STOP
3936 FOR M1=1 TO NST : FOR M2=1 TO 9
3940 D(M2,M1+M3)=DBC(M2,M1) : NEXT M2 : NEXT M1
3950 RETURN
3960 CS$=" "
3980 RETURN
4000 REM CONCATENATE STROKES
```

```
4010 FOR L=2 TO NSTRK
4014 IF X(SNO(L-1)) < 0 THEN GOTO 4090
4016 IF SL(L-1) < 4 THEN GOTO 4100
4020 ALNO=(ABS(ABS(X(SNO(L)))-ABS(X(SNO(L-1))))+ABS(Y(SNO(L))-Y(SNO(L-1))))
4021 REM LOCATE 1,1: PRINT "L,ALNO",L,ALNO
4022 IF ALNO > 100 THEN GOTO 4090 : REM TOO FAR AWAY
4024 ALNO= 8*ALNO\(SNO(L)-SNO(L-1))
4026 DD =ABS(ABS(X(SNO(L-1)))-ABS(X(SNO(L-1)+2)))+ABS(Y(SNO(L-1))-Y(SNO(L-1)+2))
4027 REM PRINT "L,DD,ALNO",L,DD,ALNO
4028 IF DD > ALNO THEN GOTO 4090 : REM TOO FAR AWAY
4030 IR1=80*SC(L)\SL(L) : IR2=80*SC(L-1)\SL(L-1)
4031 REM PRINT "L,IR1,IR2",L,IR1,IR2
4032 IF ABS(IR1) > 350 THEN GOTO 4040 :REM SMALL WIGGLE
4034 IF ABS(IR1) <  80 THEN GOTO 4038 :REM STRAIGHT LINE
4036 IF ABS(IR1-IR2) > ABS(IR1+IR2)\3 THEN GOTO 4090 ELSE GOTO 4050 : REM TOO DI
FFERENT CURVATURE
4038 IF ABS(IR2) > 80 THEN GOTO 4036 ELSE IF IR1*IR2 < -2000 THEN GOTO 4090 :REM
 TOO DIFFERENT CURVATURE
4039 GOTO 4050
4040 IF ABS(IR2) < 350 THEN GOTO 4036 ELSE IF IR1*IR2 < 0 THEN GOTO 4090
4050 ASTND=ABS(ASTRT(L)-AEND(L-1))
4051 REM PRINT "ASTND",ASTND
4052 IF ASTND > 128 THEN ASTND=ABS(ASTND-256): GOTO 4052
4054 IF ASTND > 64 THEN GOTO 4090 ELSE IF ASTND > DD*(ABS(IR1)+ABS(IR2))\40 THEN
 GOTO 4090
4056 GOTO 4100
4090 NEXT L
4099 RETURN
4100 REM COMBINE STROKES
4101 REM PRINT "COMBINING",L,L-1
4110 L1=L-1 :SLL=SL(L1)+SL(L)
4115 IF SLL = 0 THEN LOCATE 23,1 :PRINT "TWO STROKES WITH NO LENGTH" :STOP
4120 IF SXX(L) > SXX(L1) THEN SXX(L1)=SXX(L)
4122 IF SXN(L) < SXN(L1) THEN SXN(L1)=SXN(L)
4124 IF SYX(L) > SYX(L1) THEN SYX(L1)=SYX(L)
4126 IF SYN(L) < SYN(L1) THEN SYN(L1)=SYN(L)
4130 SX(L1)=(SL(L1)*SX(L1)+SL(L)*SX(L))/SLL
4133 SY(L1)=(SL(L1)*SY(L1)+SL(L)*SY(L))/SLL
4137 SA(L1)=(SL(L1)*SA(L1)+SL(L)*SA(L))/SLL
4140 SL(L1)=SLL +DD
4150 SC(L1)=SC(L1)+SC(L)+((SC(L1)+SC(L))*DD)\SLL
4160 SNO(L1)=SNO(L)  :AEND(L1)=AEND(L)
4170 NSTRK=NSTRK-1 : IF NSTRK < L THEN RETURN
4180 FOR LL=L TO NSTRK
4185 L1=LL+1 :SXX(LL)=SXX(L1) :SXN(LL)=SXN(L1) :SYX(LL)=SYX(L1) :SYN(LL)=SYN(L1)
4187 SX(LL)=SX(L1) :SY(LL)=SY(L1) :SA(LL)=SA(L1) :SC(LL)=SC(L1) :SNO(LL)=SNO(L1)
4189 SL(LL)=SL(L1) :ASTRT(LL)=ASTRT(L1): AEND(LL)=AEND(L1)
4190 NEXT LL
4195 GOTO 4010
4200 REM 2 POINT AVERAGE POINTS
4210 M2=0
4220 FOR M=2 TO NP STEP 2   :M1=M-1
4230 IF X(M1) > 0 GOTO 4240
4235 M2=M2+1 :X(M2)=X(M1) :Y(M2)=Y(M1) :GOTO 4280
4240 IF X(M) > 0 GOTO 4250
4245 M2=M2+1 :X(M2)=X(M) :Y(M2)=Y(M) :GOTO 4280
4250 IF ABS(X(M)-X(M1)) > 30 THEN GOTO 4280
4260 IF ABS(Y(M)-Y(M1)) > 30 THEN GOTO 4280
4270 M2=M2+1 :X(M2)=(X(M)+X(M1))\2 :Y(M2)=(Y(M)+Y(M1))\2
4280 NEXT M
4283 X(M2)=X(NP)
4285 NP=M2
4290 RETURN
4340 REM ORDER STROKES BY SXN
4342 XCH=0 :IF NSTRK < 2 THEN RETURN
4345 FOR L=2 TO NSTRK
4350 IF SXN(L) > SXN(L-1) THEN GOTO 4380
4355 XCH=1 :L1=L-1
4360 ST=SXX(L1) :SXX(L1)=SXX(L) :SXX(L)=ST
4361 ST=SXN(L1) :SXN(L1)=SXN(L) :SXN(L)=ST
4362 ST=SYN(L1) :SYN(L1)=SYN(L) :SYN(L)=ST
4363 ST=SYX(L1) :SYX(L1)=SYX(L) :SYX(L)=ST
4364 ST=SX(L1) :SX(L1)=SX(L) :SX(L)=ST
```

```
4365 ST=SY(L1) :SY(L1)=SY(L) :SY(L)=ST
4366 ST=SA(L1) :SA(L1)=SA(L) :SA(L)=ST
4367 ST=SC(L1) :SC(L1)=SC(L) :SC(L)=ST
4368 ST=SL(L1) :SL(L1)=SL(L) :SL(L)=ST
4369 ST=SNO(L1) :SNO(L1)=SNO(L) :SNO(L)=ST
4380 NEXT L
4390 IF XCH = 0 THEN RETURN ELSE XCH=0 :GOTO 4345
6100 REM LEARN
6105 LERN=1 :J=3: JJ=J : FOR I=1 TO 40 :AS$(I)=" " :NEXT I
6110 LINY=8*(JJ+3)-1
6120 LINE (0,LINY-LHT-8)-(639,LINY+LHT\2),0,BF
6130 LINE (8*IMARGN-1,LINY)-(639,LINY-LHT),1,B
6140 LINE (607,LINY)-(639,LINY-LHT),1,BF
6150 IF SWTPN = -1 THEN GOSUB 7100 ELSE GOSUB 8600 :REM TOUCH TECH SCREEN IN AS
CII @ 9600
6151 IF SWTPN = 1 THEN GOSUB 7300
6155 IF NP < 8 THEN GOTO 6190
6160 GOSUB 3000
6170 GOSUB 3600
6180 LOCATE 18,IMARGN: FOR I=1 TO 40: PRINT AS$(I);: NEXT I
6186 GOTO 6150
6190 FOR I=1 TO 4
6192 IF AS$(I) = "@" THEN RETURN
6194 NEXT I
6195 GOTO 6105
6200 REM INSERT
6201 XX=SXX(1): XN=SXN(1): YX=SYX(1): YN=SYN(1)
6202 XP=(XN+XX)/2: YP=(YN+YX)/2 :REM AVE CHARACTER POSITION
6203 I=INT(XP/8)+1: J=INT(YP/8)+1 :ISAV=I: JSAV=J: REM CONVERT X,Y TO I,J
6204 ML=LL(J): M1=ML+I-IMARGN :REM CALC A ARRAY INDEX OF LETTER AT I,J
6205 IF A$(ML)=" " THEN M1=M1+1
6206 IF A$(ML)=CR$ THEN M1=M1+1
6207 MSAV=M1
6210 JJ=JSAV : FOR I=1 TO 40 :AS$(I)=" " :NEXT I
6215 LINY=8*(JJ+3)-1
6220 LINE (0,LINY-LHT-8)-(639,LINY+LHT\2),0,BF
6230 LINE (8*IMARGN-1,LINY)-(639,LINY-LHT),1,B
6240 LINE (607,LINY)-(639,LINY-LHT),1,BF
6250 IF SWTPN = -1 THEN GOSUB 7100 ELSE GOSUB 8600 :REM TOUCH TECH SCREEN IN AS
CII @ 9600
6251 IF SWTPN = 1 THEN GOSUB 7300
6255 IF NP < 8 THEN GOTO 6270
6256 GOSUB 3000
6257 GOSUB 3600
6258 IF DBUG <> 0 THEN LOCATE 22,IMARGN: FOR I=1 TO 40: PRINT AS$(I);: NEXT I
6259 GOTO 6250
6270 JB=0: J=1
6271 REM LOCATE 16,1: FOR I=1 TO 40: PRINT AS$(I);: NEXT I
6272 IE=2 :FOR I=40 TO 2 STEP -1 : IF AS$(I) <> " " THEN IE=I+1 : GOTO 6274
6273 NEXT I
6274 FOR I=2 TO IE
6275 IF AS$(I) <> " " THEN GOTO 6280
6276 JB=JB+1
6278 IF JB < 3 THEN GOTO 6288
6280 J=J+1: JB=0
6282 AS$(J)=AS$(I)
6288 NEXT I
6289 REM LOCATE 17,1: FOR I=1 TO 40: PRINT AS$(I);: NEXT I
6290 AS$(J+1)=" "
6295 IF J < 2 THEN IF AS$(1) =" " THEN LOCATE 18,1 : PRINT "NO LETTERS, TRY AGAI
N" :GOTO 6210
6300 MD=J+1 : M3=MSAV : I=ISAV : J=JSAV
6310 REM LOCATE 20,1: FOR I=1 TO 40: PRINT AS$(I);: NEXT I
6315 REM INPUT IJK
6320 GOTO 1620
6500 REM REMOVE
6510 XX=SXX(1): XN=SXN(1): YX=SYX(1): YN=SYN(1)
6520 XP=(XN+XX)/2: YP=(YN+YX)/2 :REM AVE CHARACTER POSITION
6530 I=INT(XP/8)+1: J=INT(YP/8)+1 :REM CONVERT X,Y TO I,J
6540 ML=LL(J): M1=ML+I-IMARGN :REM CALC A ARRAY INDEX OF LETTER AT I,J
6550 IF A$(ML)=" " THEN M1=M1+1
6560 IF A$(ML)=CR$ THEN M1=M1+1
6570 M2=M1
```

```
6590 GOTO 1250
6600 REM PARAGRAPH
6690 GOTO 200
6700 REM REPLACE A CHARACTER WHEN WRITTEN OVER
6710 XX=SXX(1): XN=SXN(1): YX=SYX(1): YN=SYN(1)
6720 XP=(XN+XX)/2: YP=(YN+YX)/2 :REM AVE CHARACTER POSITION
6730 I=INT(XP/8)+1: J=INT(YP/8)+1 :REM CONVERT X,Y TO I,J
6740 ML=LL(J): M1=ML+I-IMARGN :REM CALC A ARRAY INDEX OF LETTER AT I,J
6750 IF A$(ML)=" " THEN M1=M1+1
6760 IF A$(ML)=CR$ THEN M1=M1+1
6770 A$(M1)=AS$(1) :LOCATE J,I :PRINT AS$(1)
6790 GOTO 200
6900 REM INSERT A LETTER
6910 XX=SXX(1): XN=SXN(1): YX=SYX(1): YN=SYN(1)
6920 XP=(XN+XX)/2: YP=(YN+YX)/2 :REM AVE CHARACTER POSITION
6930 I=INT(XP/8)+1: J=INT(YP/8)+1 :REM CONVERT X,Y TO I,J
6940 ML=LL(J): M1=ML+I-IMARGN :REM CALC A ARRAY INDEX OF LETTER AT I,J
6950 IF A$(ML)=" " THEN M1=M1+1
6960 IF A$(ML)=CR$ THEN M1=M1+1
6970 AS$(2)=AS$(1)
6980 M3=M1 :MD=1
6990 GOTO 1570
7000 REM SET UP RERUN
7010 OPEN "I",#1,"POINTS.DAT"
7020 INPUT #1,AX,BX,AY,BY
7030 RETURN
7100 REM READ POINTS
7110 INPUT #1,NP
7120 FOR N=1 TO NP
7130 INPUT #1,X(N),Y(N)
7132 NEXT N
7133 IF IFAVE = 1 THEN GOSUB 4200
7134 FOR N=1 TO NP
7135 IF X(N) > 0 THEN I=32*X(N)/AX+BX ELSE I=-32*X(N)/AX+BX
7136 J=32*Y(N)/AY+BY
7137 PSET(I,J)
7140 NEXT N
7148 IF DBUG > 5 THEN FOR N=1 TO NP: LPRINT N,X(N),Y(N):NEXT N
7149 IF DBUG <> 0 THEN LOCATE 20,2 :PRINT "NP=",NP
7150 RETURN
7200 REM SET UP STORE POINTS
7210 OPEN "O",#1,"POINTS.DAT"
7220 PRINT #1,AX,BX,AY,BY
7230 RETURN
7300 REM STORE POINTS
7310 PRINT #1,NP
7320 FOR N=1 TO NP
7330 PRINT #1, USING "######"; X(N),Y(N)
7340 NEXT N
7350 RETURN
8600 REM TT ACQUIRE POINTS IN ASCII @ 9600 WITH INSERT
8603 M=20
8605 IF LOC(2) > 0 THEN IPUT$=INPUT$(1,2) : GOTO 8605
8606 PRINT #2,"G" :N=0
8610 IF LOC(2) < 40 THEN GOTO 8610
8620 NU=0: INPUT #2,XP,YP :INPUT #2,XP,YP :INPUT #2,XPA,YPA :INPUT #2,XP0,YP0
8630 N=N+1: XPA=(XPA+XP0)\2: YPA=(YPA+YP0)\2: XP0=XPA: YP0=YPA: X(N)=XPA: Y(N)=Y
PA
8635 IF 32*XPA\AX+BX > 607 THEN GOTO 8695
8640 INPUT #2,XP,YP
8653 XPA=(XP+3*XPA)\4: YPA=(YP+3*YPA)\4
8657 IF ABS(XPA-XP0)+ABS(YPA-YP0) < 3 THEN GOTO 8672
8660 I=32*XPA\AX+BX:J=32*YPA\AY+BY:PSET(I,J)
8665 IF I > 607 THEN GOTO 8695
8670 N=N+1 : X(N)=XPA :Y(N)=YPA: XP0=XPA: YP0=YPA
8672 IF LOC(2) > 9 THEN GOTO 8640
8675 MM=0
8680 MM=MM+1: IF LOC(2) > 9 THEN GOTO 8640 ELSE IF MM < M THEN GOTO 8680
8685 X(N)=-X(N): IF X(N) = 0 THEN X(N)=-1
8690 IF LOC(2) > 39 THEN GOTO 8620 ELSE NU=NU+1 :IF NU < 25000 THEN GOTO 8690
8695 PRINT #2,"S": NP=N
8696 IF DEBUG <> 0 THEN LOCATE 20,2 :PRINT "NP=",NP
8697 IF IFAVE = 2 THEN GOSUB 4200
```

```
8698 IF DEBUG <> 0 THEN LOCATE 20,12 :PRINT NP
8699 RETURN
9600 REM TT ACQUIRE POINTS IN ASCII  @ 9600  WITH MENU
9603 M=20
9605 IF LOC(2) > 0 THEN IPUT$=INPUT$(1,2) : GOTO 9605
9606 PRINT #2,"G"
9610 II=0 :JJ=0 :N=0
9640 INPUT #2,XP,YP
9660 II=32*XP\AX+BX+II: JJ=32*YP\AY+BY+JJ: N=N+1
9670 IF N < 10 THEN GOTO 9674
9672 I=II\10: J=JJ\10: N=0 :II=0: JJ=0
9673 LINE (I+1,J+1)-(I-1,J-1),1,B
9674 IF LOC(2) > 9 GOTO 9640
9675 MM=0
9680 MM=MM+1: IF LOC(2) > 9 THEN GOTO 9640 ELSE IF MM < M THEN GOTO 9680
9690 IF LOC(2) > 9 THEN GOTO 9610  ELSE NU=NU+1 :IF NU < 1500 THEN GOTO 9690
9695 PRINT #2,"S"
9699 RETURN
10700 REM SET UP TOUCH SCREEN FOR ASCII  @ 9600
10710 OPEN "I",#2,"CAL.DAT"
10720 INPUT #2,AX,BX,AY,BY
10730 CLOSE #2
10740 OPEN "COM1:9600,N,8,1,CS0,DS0" AS #2
10750 PRINT #2,"S"
10760 RETURN
11000 REM UTILITIES
11100 REM input selection menus
11101 REM mnum= no. of items
11102 REM mtitl$=titles
11103 REM mi0,mie,mj0,mje=start & end points for boxes
11105 IF KYBD=1 GOTO 11400
11110 LINE(MI0,MJ0)-(MIE,MJE),0,BF :LINE(MI0,MJ0)-(MIE,MJE),1,B
11115 XX=MI0 : MRATO=(MIE-MI0)\MNUM
11120 FOR K=1 TO MNUM : LINE (XX,MJ0)-(XX,MJE)
11130 MJA=(MJ0+MJE+8)\16+1 : LOCATE MJA,(XX+20)\8 : PRINT MTITL$(K)
11140 XX=XX+MRATO :NEXT K
11160 RETURN
11300 REM DETERMINE MENU ITEM SELECTED
11310 IF KYBD=1 GOTO 11600
11320 XX=0 : FOR K=1 TO MNUM : XX=XX+MRATO : IF I < XX THEN GOTO 11340
11330 NEXT K
11340 MSEL=K
11350 RETURN
11400 REM DISPLAY KEYBOARD
11405 JMENU=163
11410 LINE(1,160)-(639,199),0,BF
11440 FOR I=  1 TO  26 :LOCATE 22,2*I : PRINT CHR$(I+64), : NEXT I
11450 FOR I=  1 TO  26 :LOCATE 24,2*I : PRINT CHR$(I+96), : NEXT I
11460 FOR I= 1 TO  10 :LOCATE 22,2*I+52 : PRINT CHR$(I+47), : NEXT I
11470 LOCATE 22,74 : PRINT ". ^ ? ",
11480 LOCATE 24,54 : PRINT "\ / * + - ( ) , ; : ";CHR$(34);" $ &";
11482 FOR J=163 TO 195 STEP 16 : LINE(3,J)-(629,J) :NEXT J
11484 FOR I=  3 TO 635 STEP 16 : LINE(I,163)-(I,195) :NEXT I
11490 LOCATE 1 ,1 :RETURN
11600 REM keyboard select from menu
11620 MSEL=(I\8+1)\2
11640 IF J > 179 THEN GOTO 11700
11650 IF MSEL < 27 THEN MSEL=MSEL+64 : RETURN
11660 IF MSEL < 37 THEN MSEL=MSEL+21 : RETURN
11670 IF MSEL=37 THEN MSEL=46 : RETURN
11680 IF MSEL=38 THEN MSEL=94 : RETURN
11690 MSEL=63 : RETURN
11700 IF MSEL < 27 THEN MSEL=MSEL+96 : RETURN
11710 IF MSEL=27 THEN MSEL=92 : RETURN
11720 IF MSEL=28 THEN MSEL=47 : RETURN
11730 IF MSEL=29 THEN MSEL=42 : RETURN
11740 IF MSEL=30 THEN MSEL=43 : RETURN
11750 IF MSEL=31 THEN MSEL=45 : RETURN
11760 IF MSEL=32 THEN MSEL=40 : RETURN
11770 IF MSEL=33 THEN MSEL=41 : RETURN
11780 IF MSEL=34 THEN MSEL=44 : RETURN
11790 IF MSEL=35 THEN MSEL=59 : RETURN
11800 IF MSEL=36 THEN MSEL=58 : RETURN
```

```
8698 IF DEBUG <> 0 THEN LOCATE 20,12 :PRINT NP
8699 RETURN
9600 REM TT ACQUIRE POINTS IN ASCII  @ 9600   WITH MENU
9603 M=20
9605 IF LOC(2) > 0 THEN IPUT$=INPUT$(1,2) : GOTO 9605
9606 PRINT #2,"G"
9610 II=0 :JJ=0 :N=0
9640 INPUT #2,XP,YP
9660 II=32*XP\AX+BX+II: JJ=32*YP\AY+BY+JJ: N=N+1
9670 IF N < 10 THEN GOTO 9674
9672 I=II\10: J=JJ\10: N=0 :II=0: JJ=0
9673 LINE (I+1,J+1)-(I-1,J-1),1,B
9674 IF LOC(2) > 9 GOTO 9640
9675 MM=0
9680 MM=MM+1: IF LOC(2) > 9 THEN GOTO 9640 ELSE IF MM < M THEN GOTO 9680
9690 IF LOC(2) > 9 THEN GOTO 9610  ELSE NU=NU+1 :IF NU < 1500 THEN GOTO 9690
9695 PRINT #2,"S"
9699 RETURN
10700 REM SET UP TOUCH SCREEN FOR ASCII  @ 9600
10710 OPEN "I",#2,"CAL.DAT"
10720 INPUT #2,AX,BX,AY,BY
10730 CLOSE #2
10740 OPEN "COM1:9600,N,8,1,CS0,DS0" AS #2
10750 PRINT #2,"S"
10760 RETURN
11000 REM UTILITIES
11100 REM input selection menus
11101 REM mnum= no. of items
11102 REM mtitl$=titles
11103 REM mi0,mie,mj0,mje=start & end points for boxes
11105 IF KYBD=1 GOTO 11400
11110 LINE(MI0,MJ0)-(MIE,MJE),0,BF :LINE(MI0,MJ0)-(MIE,MJE),1,B
11115 XX=MI0 : MRATO=(MIE-MI0)\MNUM
11120 FOR K=1 TO MNUM : LINE (XX,MJ0)-(XX,MJE)
11130 MJA=(MJ0+MJE+8)\16+1 : LOCATE MJA,(XX+20)\8 : PRINT MTITL$(K)
11140 XX=XX+MRATO :NEXT K
11160 RETURN
11300 REM DETERMINE MENU ITEM SELECTED
11310 IF KYBD=1 GOTO 11600
11320 XX=0 : FOR K=1 TO MNUM : XX=XX+MRATO : IF I < XX THEN GOTO 11340
11330 NEXT K
11340 MSEL=K
11350 RETURN
11400 REM DISPLAY KEYBOARD
11405 JMENU=163
11410 LINE(1,160)-(639,199),0,BF
11440 FOR I= 1 TO  26 :LOCATE 22,2*I : PRINT CHR$(I+64), : NEXT I
11450 FOR I= 1 TO  26 :LOCATE 24,2*I : PRINT CHR$(I+96), : NEXT I
11460 FOR I= 1 TO  10 :LOCATE 22,2*I+52 : PRINT CHR$(I+47), : NEXT I
11470 LOCATE 22,74 : PRINT ". ^ ? ",
11480 LOCATE 24,54 : PRINT "\ / * + - ( ) , ; : ";CHR$(34);" $ &";
11482 FOR J=163 TO 195 STEP 16 : LINE(3,J)-(629,J) :NEXT J
11484 FOR I= 3 TO 635 STEP 16 : LINE(I,163)-(I,195) :NEXT I
11490 LOCATE 1 ,1  :RETURN
11600 REM keyboard select from menu
11620 MSEL=(I\8+1)\2
11640 IF J > 179 THEN GOTO 11700
11650 IF MSEL < 27 THEN MSEL=MSEL+64 : RETURN
11660 IF MSEL < 37 THEN MSEL=MSEL+21 : RETURN
11670 IF MSEL=37 THEN MSEL=46 : RETURN
11680 IF MSEL=38 THEN MSEL=94 : RETURN
11690 MSEL=63 : RETURN
11700 IF MSEL < 27 THEN MSEL=MSEL+96 : RETURN
11710 IF MSEL=27 THEN MSEL=92 : RETURN
11720 IF MSEL=28 THEN MSEL=47 : RETURN
11730 IF MSEL=29 THEN MSEL=42 : RETURN
11740 IF MSEL=30 THEN MSEL=43 : RETURN
11750 IF MSEL=31 THEN MSEL=45 : RETURN
11760 IF MSEL=32 THEN MSEL=40 : RETURN
11770 IF MSEL=33 THEN MSEL=41 : RETURN
11780 IF MSEL=34 THEN MSEL=44 : RETURN
11790 IF MSEL=35 THEN MSEL=59 : RETURN
11800 IF MSEL=36 THEN MSEL=58 : RETURN
```

```
11810 IF MSEL=37 THEN MSEL=34 : RETURN
11820 IF MSEL=38 THEN MSEL=36 : RETURN
11830 MSEL=38 : RETURN
11850 RETURN
12000 REM input output
12100 REM read in text
12110 OPEN "I", #1,"TEXT" :NC=0
12120 IF EOF(1) THEN CLOSE #1 : GOTO 12160
12130 INPUT #1, A1$ :KK=0
12140 FOR K=1 TO LEN(A1$) : KK=KK+1 :A$(NC+KK)=MID$(A1$,K,1)
12143 IF LEN(A$(NC+KK))=0 THEN KK=KK-1
12145 NEXT K
12150 NC=NC+KK:IF NC < 1500 THEN  GOTO 12120
12155 PRINT "TOO MUCH TEXT" : STOP
12160 REM TEXT EDITOR INITIALIZATION
12170 II=IMARGN : JJ=JTOP  : NC1=1  : REM DISPLAY ALL TEXT
12175 CLOSE #1
12180 RETURN
12500 REM SAVE SYMBOL DATA BASE
12505 IF SWTPN <> 0 THEN CLOSE #1
12510 OPEN "O",#1,"SYM.DAT"
12520 PRINT #1,NDBT
12530 M2=0 :FOR M=1 TO NDBT
12540 PRINT #1, DN(M) DC(M)
12550 FOR M1=M2+1 TO M2+DN(M)
12560 PRINT #1, D(1,M1) D(2,M1) D(3,M1) D(4,M1) D(5,M1) D(6,M1) D(7,M1)
12570 NEXT M1 :M2=M2+DN(M) : NEXT M
12580 CLOSE #1
12590 END
12700 REM RESTART READ IN DATA BASE
12710 OPEN "I",#1,"SYM.DAT"
12720 INPUT #1,NDBT
12730 M2=0 :FOR M=1 TO NDBT
12740 INPUT #1,DN(M),DC(M)
12750 FOR M1=M2+1 TO M2+ DN(M)
12760 INPUT #1,D(1,M1),D(2,M1),D(3,M1),D(4,M1),D(5,M1),D(6,M1),D(7,M1)
12770 NEXT M1 :M2=M2+DN(M) : NEXT M
12780 CLOSE #1
12790 RETURN
30000 FOR I=1 TO NSTRK:PRINT I,SNO(I),SX(I),SY(I),SL(I),SA(I),SC(I):NEXT I
30010 FOR I=1 TO NP:PRINT I,X(I),Y(I):NEXT I
30020 FOR I=1 TO NSTRK:PRINT USING "#####";I,SNO(I),SX(I),SY(I),SL(I),SA(I),SC(I
):NEXT I
30030 FOR M1=1 TO NST :FOR M2=1 TO 5 :PRINT M1,M2,D(M2,M1),DBC(M2,M1):NEXT M2 :N
EXT M1
```

APPENDIX III

A1 - angle of slope between Point M and M1
A2 - previous angle
DA1 - change in angle (A1-A2)
SEND - flag for end of Stroke
ZX - double precision X position summation by arc length weighting
ZY - double precision Y position summation by arc length weighting
ZA - double precision angle summation by arc length weighting
ZDA - double precision change in angle summation
ZL - double precision length
NSP - number of Points in Stroke, counter
NSTRK - number of Strokes
XX - maximum X
XN - minimum X
YX - maximum Y
YN - minimum Y
M1 - Pointer to previous Point
M2 - (1) minimum number of Points for which to adjust for
     $2\pi$ angle
M3 - (2) minimum number of Points for which to calculate <u>change</u>
     in change in angle
NLONG - counter (not used)
M - Pointer to Point being considered
NP - number of Points
X - array of X coordinate
Y - array of Y coordinate

```
DX  - change in X
DY  - change in Y
ADX - absolute value of DX
ADY - absolute value of DY
DS  - pseudo arc length ADX + ADY
AY  - calibration multiplier for vertical (Y) direction, e.g.
      AY ' O mean coordinate system true downward
ADA - running average change in angle
DA2 - previous change in angle
ASTRT - array for starting angle of Stroke
SZL - single precision Stroke length
SNO - array of number of the 1st Point for each Stroke
LHT5 - height between lines divided by 5 in display coordinates
       used as a measure
SL  - array of Stroke lengths sealed to height between lines
AEND - array of angles at end of Strokes
SC  - array of angle changes for eachs troke
AZA - average angle through Stroke
SX  - array of averages centroid X coordinate for each Stroke
SY  - array of averages centroid Y coordinate for each Stroke
SA  - array of averages angle (slope) coordinate for each Stroke
SXX - array of maximum X coordinate for each Stroke
SXN - array of minimum X coordinate for each Stroke
SYN - array of minimum Y coordinate for each Stroke
SYX - array of maximum Y coordinate for each Stroke
DBUG - debugging flag for printing
INPUT - string of input bytes to be rejected
XP, YP - input coordinates
XPA - average 2 Points in X direction
YPA - average 2 Points in Y direction
XPO - initial X average on pan down
YPO - initial Y average on pan down
I  - display pixel corresponding to X coordinate input
J  - display pixel corresponding to Y coordinate input
N  - counter of input Points
MM - counter for timing pan up
NU - counter for timing pan up
```

What is claimed is:

1. An apparatus for entering data into a form, said apparatus comprising:

a display screen for displaying a form including both predetermined text and data entry areas associated with said predetermined text;

a memory for storing said predetermined text and for storing data associated with the form;

hand-held means for use by a user to write or draw a handwritten symbol in said text and data entry areas;

position detecting means, coupled to said display screen, for detecting the position of the hand-held means on or over the display screen and generating locating signals representative of the handwritten symbol;

first means, coupled to the position detecting means and the display screen, for displaying on the display screen an image of the handwritten symbol as it is drawn;

second means, coupled to the display screen, for displaying one of a plurality of predetermined font symbols on the display screen, and for permitting an exemplary handwritten symbol corresponding to the displayed predetermined font symbol to be written or drawn on the display screen by the individual user;

a database, coupled to the display screen, for storing a characteristic of the written or drawn exemplary handwritten symbol, means, coupled to the database, for storing the characteristic of the written or drawn exemplary handwritten symbol in the database as a characteristic of the corresponding predetermined font symbol; and a processor, coupled to the position detecting means, including means for comparing a characteristic of a handwritten symbol with the characteristic in the database, the processor for processing said locating signals to identify whether the handwritten symbol matches one of the plurality of predetermined font symbols, and, if the handwritten symbol matches a predetermined font symbol, displaying the matching font symbol and entering the matching font symbol into said memory.

2. The apparatus according to claim 1 wherein the database is created in a learning mode by an initialization routine in which each of a plurality of predetermined font symbols is displayed on the display screen and the individual user writes or draws an exemplary handwritten symbol corresponding to each predetermined font symbol.

3. An apparatus for entering data into a form, said apparatus comprising:

a display screen for displaying a form including both predetermined text and data entry areas associated with said predetermined text;

a memory for storing said predetermined text and for storing data associated with the form;

hand-held means for use by a user to write or draw a handwritten symbol in said text and data entry areas;

position detecting means, coupled to said display screen, for detecting the position of the hand-held means on or over the display screen and generating locating signals representative of the handwritten symbol;

means, coupled to the position detecting means and the display screen, for displaying on the display screen an image of the handwritten symbol as it is drawn; and a processor, coupled to the position detecting means, including a database of characteristics of a plurality of predetermined font symbols, and means for comparing a characteristic of a handwritten symbol with the characteristics in the database to identify whether the handwritten symbol matches a predetermined font symbol, and, if the handwritten symbol matches a predetermined font symbol, displaying the matching font symbol and entering the matching font symbol into said memory, and wherein characteristics of the plurality of predetermined font symbols are stored as entries in the database and, depending on the frequency of use of the respective associated handwritten symbols by the user, the order of the entries in the database is swapped or sorted or shuffled so that, when a comparison is made between a characteristic of a handwritten symbol and entries in the database, the comparison is made with the more frequently used database entries first.

4. An apparatus for entering data into a form, said apparatus comprising:

a display screen for displaying predetermined text and data entry areas associated with the form;

a memory for storing said predetermined text and for storing data associated with the form;

hand-held means for use by a user to write or draw a handwritten symbol in said text and data entry areas;

position detecting means, coupled to said display screen, for detecting the position of the hand-held means on or over the display screen and generating locating signals representative of the handwritten symbol;

means, coupled to the position detecting means and the display screen, for displaying on the display screen an image of the handwritten symbol as it is drawn;

means, coupled to the display screen, to define and display an area on the display screen and to assign a function to the defined area, the display of the defined area changing to reverse video and the function being carried out if the position detecting means detects that the hand-held means is in a position on or over the defined area on the display screen; and a processor, coupled to the position detecting means, for processing said locating signals to identify whether the handwritten symbol matches one of a plurality of predetermined font symbols, and, if the handwritten symbol matches a predetermined font symbol, displaying the matching font symbol and entering the matching font symbol into said memory.

5. A portable, self-contained apparatus for processing commands that is usable while standing or walking, said apparatus comprising:

a memory;

a power supply for supplying power to the apparatus;

a display screen for displaying handwritten and computer-generated text;

a hand-held means for use by a user to write or draw a handwritten symbol at an arbitrary location on the display screen;

a digitizing means for detecting the position of the hand-held means on or over the display screen and digitizing the handwritten symbol to generate signals representative of the handwritten symbol;

means, coupled to the digitizing means and the display screen, for displaying on the display screen an image of the handwritten symbol as it is drawn on the display screen;

means, coupled to the display screen, to define and display an area on the display screen and to assign a function to the defined area, the display of the defined area changing to reverse video and the function being carried out if the digitizing means detects that handheld means is in a position on or over the defined area on the display screen: and, a processor, coupled to the digitizing means, for identifying whether the handwritten symbol matches one of a plurality of predetermined command symbols, and, if the handwritten symbol matches a predetermined command symbol, executing a command based upon the identity of the handwritten symbol to perform an operation on a portion of the text displayed on the display screen, said portion of text being identified by the location of the handwritten symbol.

* * * * *